(12) United States Patent
Ferreira et al.

(10) Patent No.: US 7,682,738 B2
(45) Date of Patent: Mar. 23, 2010

(54) LEAD ACID BATTERY WITH GELLED ELECTROLYTE FORMED BY FILTRATION ACTION OF ABSORBENT SEPARATORS AND METHOD FOR PRODUCING IT

(75) Inventors: Antonio L. Ferreira, Nashua, NH (US); George C. Zgruis, Canterbury, NH (US); Norman Lifshutz, Nashua, NH (US)

(73) Assignee: KVG Technologies, Inc., East Walpole, MA (US)

( * ) Notice: Subject to any disclaimer, the term of this patent is extended or adjusted under 35 U.S.C. 154(b) by 1444 days.

(21) Appl. No.: 10/504,700

(22) PCT Filed: Feb. 7, 2003

(86) PCT No.: PCT/US03/03803

§ 371 (c)(1),
(2), (4) Date: Aug. 6, 2004

(87) PCT Pub. No.: WO03/067684

PCT Pub. Date: Aug. 14, 2003

(65) Prior Publication Data

US 2005/0042512 A1 Feb. 24, 2005

Related U.S. Application Data

(60) Provisional application No. 60/407,072, filed on Aug. 30, 2002, provisional application No. 60/355,507, filed on Feb. 7, 2002.

(51) Int. Cl.
*H01M 6/04* (2006.01)
(52) U.S. Cl. .................. 429/204; 429/252; 429/302; 429/300; 29/623.2
(58) Field of Classification Search .............. 429/132, 429/134, 145, 302, 300, 252, 204
See application file for complete search history.

(56) References Cited

U.S. PATENT DOCUMENTS

| 1,536,064 A | 5/1925 | Benner et al. |
| 1,559,471 A | 10/1925 | Strasser |
| 1,634,850 A | 7/1927 | Powers |

(Continued)

FOREIGN PATENT DOCUMENTS

CA    1158303 A1    12/1983

(Continued)

OTHER PUBLICATIONS

Anonymous, About Us, http://www.rhodia-silica.com/silica (Printed Aug. 19, 2002).

(Continued)

*Primary Examiner*—Patrick Ryan
*Assistant Examiner*—Ben Lewis
(74) *Attorney, Agent, or Firm*—Choate, Hall & Stewart LLP

(57) ABSTRACT

A method for producing a lead acid battery that operates on the oxygen cycle is disclosed. The method includes the steps of: assembling a cell comprising a positive plate, a negative plate, and a sheet of separator material which is an absorbent, porous filtration medium, so that there is free space between the plates and surfaces of the separator, inserting the cell into a case, introducing into the case a mixture of sulfuric acid and silica including silica from a never dried precipitated silica slurry, causing the sulfuric acid in the mixture in the free space to gel, and sealing the case. The sulfuric acid in the mixture in the free space can be caused to gel by an increase in the silica content thereof, by an increase in the specific gravity thereof, or by both an increase in the silica content thereof, and an increase in the specific gravity thereof.

23 Claims, 10 Drawing Sheets

U.S. PATENT DOCUMENTS

| | | | |
|---|---|---|---|
| 2,043,954 A | 6/1936 | Kershaw | |
| 2,305,121 A | 12/1942 | Wheat | |
| 2,465,493 A | 3/1949 | Strickhouser et al. | |
| 3,011,007 A | 11/1961 | Evers et al. | |
| 3,172,782 A | 3/1965 | Jache | |
| 3,228,803 A | 1/1966 | Little | |
| 3,265,535 A * | 8/1966 | Sundberg | 429/141 |
| 3,288,642 A | 11/1966 | Kordesch | |
| 3,305,396 A | 2/1967 | Rauter | |
| 3,408,233 A | 10/1968 | Parker et al. | |
| 3,457,112 A | 7/1969 | Reber | |
| 3,556,860 A | 1/1971 | Amlie | |
| 3,663,304 A | 5/1972 | Marsh et al. | |
| 3,709,737 A | 1/1973 | Fujimoto et al. | |
| 3,711,332 A | 1/1973 | Bastacky | |
| 3,765,942 A | 10/1973 | Jache | |
| 3,765,950 A | 10/1973 | Lauck | |
| 3,773,590 A | 11/1973 | Morgan | |
| 3,776,779 A * | 12/1973 | Johnson | 429/303 |
| 3,798,294 A | 3/1974 | Hollenbeck | |
| 3,862,861 A | 1/1975 | McClelland et al. | |
| 3,870,563 A | 3/1975 | Ruben | |
| 3,947,537 A | 3/1976 | Buntin et al. | |
| 4,003,758 A | 1/1977 | Palmer et al. | |
| 4,007,122 A | 2/1977 | Owens et al. | |
| 4,039,730 A | 8/1977 | Brinkmann et al. | |
| 4,041,218 A | 8/1977 | Axelrod et al. | |
| 4,113,927 A | 9/1978 | Johnson et al. | |
| 4,150,199 A | 4/1979 | Tuphorn et al. | |
| 4,165,352 A | 8/1979 | Volkman | |
| 4,205,123 A | 5/1980 | Palmer et al. | |
| 4,228,225 A | 10/1980 | O'Rell et al. | |
| 4,233,379 A | 11/1980 | Gross et al. | |
| 4,245,013 A | 1/1981 | Clegg et al. | |
| 4,262,068 A | 4/1981 | Kono et al. | |
| 4,317,872 A | 3/1982 | Varma | |
| 4,370,803 A | 2/1983 | Eberle | |
| 4,391,036 A | 7/1983 | Kishimoto et al. | |
| 4,403,024 A | 9/1983 | Gordon et al. | |
| 4,414,302 A | 11/1983 | Jache et al. | |
| 4,465,748 A | 8/1984 | Harris | |
| 4,490,447 A | 12/1984 | Battersby | |
| 4,537,699 A | 8/1985 | Jas | |
| 4,619,875 A | 10/1986 | Stahura et al. | |
| 4,652,505 A | 3/1987 | Komaki et al. | |
| 4,687,718 A * | 8/1987 | Chreitzberg et al. | 429/302 |
| 4,704,425 A | 11/1987 | Lagarde et al. | |
| 4,725,516 A | 2/1988 | Okada et al. | |
| 4,874,594 A | 10/1989 | Chevallier | |
| 4,879,967 A | 11/1989 | Sengoku | |
| 4,889,778 A | 12/1989 | Misra et al. | |
| 4,894,300 A | 1/1990 | Kugler | |
| 4,897,026 A | 1/1990 | Yokoya | |
| 4,927,722 A | 5/1990 | Bohnstedt et al. | |
| 4,929,251 A | 5/1990 | Jache | |
| 4,937,156 A | 6/1990 | Boeller et al. | |
| 5,009,971 A | 4/1991 | Johnson et al. | |
| 5,035,966 A | 7/1991 | Tokunaga et al. | |
| 5,091,275 A | 2/1992 | Brecht et al. | |
| 5,114,806 A | 5/1992 | Chiacchio et al. | |
| 5,128,218 A | 7/1992 | Tokunaga et al. | |
| 5,180,647 A | 1/1993 | Rowland et al. | |
| 5,202,196 A | 4/1993 | Wang et al. | |
| 5,206,100 A | 4/1993 | Muto et al. | |
| 5,225,298 A | 7/1993 | Nakayama et al. | |
| 5,234,493 A | 8/1993 | Dromard et al. | |
| 5,264,304 A | 11/1993 | Kragness et al. | |
| 5,296,320 A | 3/1994 | Ginatta et al. | |
| 5,338,596 A | 8/1994 | Bechtold et al. | |
| 5,376,479 A | 12/1994 | Gerner | |
| 5,379,502 A * | 1/1995 | Feldstein | 29/2 |
| 5,401,596 A | 3/1995 | Stoilov et al. | |
| 5,418,273 A | 5/1995 | Dromard et al. | |
| 5,468,575 A | 11/1995 | Holland et al. | |
| 5,541,013 A | 7/1996 | Shiomi et al. | |
| 5,558,952 A | 9/1996 | Knauer | |
| 5,605,569 A | 2/1997 | Boyer et al. | |
| 5,648,011 A | 7/1997 | Blonsky | |
| 5,664,321 A | 9/1997 | Sielemann et al. | |
| 5,665,488 A | 9/1997 | Young et al. | |
| 5,679,479 A | 10/1997 | Young et al. | |
| 5,716,734 A | 2/1998 | Nakano | |
| 5,723,231 A | 3/1998 | Wu et al. | |
| 5,789,103 A | 8/1998 | Young et al. | |
| 5,853,916 A | 12/1998 | Venugopal et al. | |
| 5,874,594 A | 2/1999 | Baker et al. | |
| 5,882,617 A | 3/1999 | Chevallier et al. | |
| 5,894,055 A | 4/1999 | Young et al. | |
| 5,965,299 A | 10/1999 | Khan et al. | |
| 5,985,484 A | 11/1999 | Young et al. | |
| 6,001,322 A | 12/1999 | Chevallier et al. | |
| 6,054,084 A | 4/2000 | Khavari | |
| 6,107,226 A | 8/2000 | Chevallier | |
| 6,114,068 A | 9/2000 | Yamada et al. | |
| 6,132,899 A | 10/2000 | Young et al. | |
| 6,136,867 A | 10/2000 | Frouin et al. | |
| 6,169,135 B1 | 1/2001 | Chevallier et al. | |
| 6,218,052 B1 | 4/2001 | Wang | |
| 6,221,149 B1 | 4/2001 | Bomal et al. | |
| 6,322,923 B1 | 11/2001 | Spotnitz et al. | |
| 6,406,813 B2 | 6/2002 | Rao | |
| 6,458,489 B1 | 10/2002 | Alzieu et al. | |
| 6,475,665 B1 | 11/2002 | Okamoto et al. | |
| 6,492,059 B1 * | 12/2002 | Hottori et al. | 429/136 |
| 2001/0000239 A1 | 4/2001 | Shiomi et al. | |
| 2001/0010881 A1 | 8/2001 | Ehrlich | |
| 2002/0192562 A1 | 12/2002 | Ferreira et al. | |
| 2003/0003040 A1 | 1/2003 | Lindner et al. | |
| 2003/0157400 A1 | 8/2003 | Muneret | |
| 2006/0068294 A1 | 3/2006 | Mraz et al. | |

FOREIGN PATENT DOCUMENTS

| | | |
|---|---|---|
| CN | 86209279U U | 2/1988 |
| CN | 1051107 A | 5/1991 |
| CN | 1066937 A | 12/1992 |
| CN | 1072045 A | 5/1993 |
| CN | 1274960 A | 11/2000 |
| DE | 3603196 A1 | 8/1987 |
| DE | 3865830 | 8/1987 |
| EP | 0049371 A2 | 4/1982 |
| EP | 0272474 A2 | 6/1988 |
| EP | 0349868 B1 | 1/1990 |
| EP | 0377828 A1 | 7/1990 |
| EP | 0443451 B1 | 8/1991 |
| EP | 0491150 B1 | 6/1992 |
| EP | 0598996 A1 | 6/1994 |
| EP | 0608590 A1 | 8/1994 |
| EP | 0680105 A1 | 11/1995 |
| EP | 0926757 A2 | 6/1999 |
| FR | 2770342 A1 | 4/1999 |
| GB | 991959 A | 5/1965 |
| GB | 1025975 A | 4/1966 |
| JP | 52109119 A | 9/1977 |
| JP | 53103535 A | 9/1978 |
| JP | 56123675 A | 9/1981 |
| JP | 57148882 A | 9/1982 |
| JP | 58080273 A | 5/1983 |
| JP | 58082472 A | 5/1983 |
| JP | 59014272 A | 1/1984 |
| JP | 59177863 A | 10/1984 |
| JP | 60003871 A | 1/1985 |
| JP | 60163379 A | 8/1985 |
| JP | 61179061 A | 8/1986 |

| | | | |
|---|---|---|---|
| JP | 61179068 A | 8/1986 |
| JP | 61198553 A | 9/1986 |
| JP | 61250968 A | 11/1986 |
| JP | 61267274 A | 11/1986 |
| JP | 61269869 A | 11/1986 |
| JP | 62126565 A | 6/1987 |
| JP | 62154476 A | 7/1987 |
| JP | 62223988 A | 10/1987 |
| JP | 63086271 A | 4/1988 |
| JP | 63086272 A | 4/1988 |
| JP | 63121245 A | 5/1988 |
| JP | 63221565 A | 9/1988 |
| JP | 1006360 A | 1/1989 |
| JP | 1045067 A | 2/1989 |
| JP | 1045068 A | 2/1989 |
| JP | 1045069 A | 2/1989 |
| JP | 1045070 A | 2/1989 |
| JP | 1060955 A | 3/1989 |
| JP | 1095465 A | 4/1989 |
| JP | 1100869 A | 4/1989 |
| JP | 1217866 A | 8/1989 |
| JP | 1235166 A | 9/1989 |
| JP | 1258367 A | 10/1989 |
| JP | 1294369 A | 11/1989 |
| JP | 2158062 A | 6/1990 |
| JP | 2158063 A | 6/1990 |
| JP | 3008268 A | 1/1991 |
| JP | 3043966 A | 2/1991 |
| JP | 3163755 A | 7/1991 |
| JP | 3252063 A | 11/1991 |
| JP | 4026072 A | 1/1992 |
| JP | 4028168 A | 1/1992 |
| JP | 4058466 A | 2/1992 |
| JP | 4118854 A | 4/1992 |
| JP | 4132171 A | 5/1992 |
| JP | 4141961 A | 5/1992 |
| JP | 4149967 A | 5/1992 |
| JP | 4149968 A | 5/1992 |
| JP | 4160762 A | 6/1992 |
| JP | 4308666 A | 10/1992 |
| JP | 4366546 A | 12/1992 |
| JP | 5047410 A | 2/1993 |
| JP | 6096793 A | 4/1994 |
| JP | 6150960 A | 5/1994 |
| JP | 6223862 A | 8/1994 |
| JP | 11097033 A | 4/1999 |
| JP | 11185773 A | 7/1999 |
| JP | 2000251896 A | 9/2000 |
| JP | 2001068118 A | 3/2001 |
| JP | 2001283898 A | 10/2001 |
| JP | 2003036831 A | 2/2003 |
| WO | WO-9730486 A1 | 8/1997 |
| WO | WO-9745365 A1 | 12/1997 |
| WO | WO-9818173 A1 | 4/1998 |
| WO | WO-9922416 A1 | 5/1999 |
| WO | WO-9944247 A1 | 9/1999 |
| WO | WO-0023267 A1 | 4/2000 |
| WO | WO-0146073 A1 | 6/2001 |
| WO | WO-03061030 A2 | 7/2003 |

OTHER PUBLICATIONS

Anonymous, Chemical Reactivity of Sodium Silicates.
Anonymous, Colloidal Silica Group, Your guarantee of consistency, http://www.ekachemicals.se/csgrp/bottom.html (Printed Aug. 19, 2002).
Anonymous, Colloidal Silica, http://labkorea.com/products/chemical/silica/colloidalsilica.html (Printed Aug. 19, 2002).
Anonymous, DuPont Air Products Nanomaterials Unveils New Colloidal Silica Slurry for Enhanced Chemicals Mechanical Planarization, http://www.airproducts.com/corp/re1/02044.asp (Printed Aug. 19, 2002).
Anonymous, NRDC Technology offer-Precipitated Silica, http://nrdcindia.com/pages./silica.htm (Printed Aug. 19, 2002).
Anonymous, Other Specialty Chemicals.
Anonymous, Our applications, http://www.ekachemicals.se/csgrp/cont04.html (Printed Aug. 19, 2002).
Anonymous, Precipitated Silica China Clay Calcium Carbonate, http://www.shamachemicals.com/mincrals.html (Printed Aug. 19, 2002).
Anonymous, Products, http://www.ekachemicals.se/csgrp/cont30.html (Printed Aug. 19, 2002).
Anonymous, Safety Data Sheet.
Anonymous, Silica—Colloidal Silica (Silicon Dioxide), http://www.amazon.com/detail.asp?ArticleID=1385 (Printed Aug. 19, 2002).
Anonymous, Specialist in colloidal silicas "So much happens all the time," Eka Echo 2 (1999).
Anonymous, Sterling Chemicals, http://sterlchem.com/col_silica.htm (Printed Aug. 19, 2002).
Chen et al., Structure of Precipated Silica, University of Cincinnati.
DC Chemical Co., Ltd., Micloid, http://eng.dcchem.co.kr/product/p_basic/p_basic16thm (Printed Aug. 6, 2002).
DuPont Specialty Chemicals, Ludox Colloidal Silica.
Eka Chemicals, What is colloidal silica, http://www.ekachemicals.se/csgrp/cont02.html (Printed Aug. 19, 2002).
Electric Accumulators.
Francia et al., Influence of Phosphoric Acid and Colloidal Silica on the Performance of Batteries for Photovoltaic Application, Journal of the Electrochemical Society, 150(6):A826-A834 (2003).
Grace Davidson Products, Ludox Colloidal Silica, (Printed Aug. 16, 2002).
International Preliminary Examination Report for PCT/US03/03803 (Jul. 30, 2003).
International Search Report for PCTUS03/03803 (Sep. 12, 2003).
Misra et al., VRLA Battery with AGM-Gel Hybrid for Superior Performance, IEICE/IEEE Intelec'03, Oct. 19-23, 2003.
Nerac Inc., Silica in Batteris: Milled or by Varta, (Jun. 1, 2001).
Nerac Inc., Tech Track: Separators Patents (Jun. 13, 2003).
Search Report for key words lead and (gel or gell or gelled), printed Nov. 8, 2001.
Search Report for key words lead and (gel or gell or gelled), printed Nov. 7, 2001.
Supplementary European Search Report for EP 03 70 7793 (Aug. 3, 2006).
Supplementary Partial European Search Report for EP 03 70 7793 (Aug. 3, 2006).
Glass—An Overview, http://www.amazon.com/detail.asp?ArticleID=1012.

* cited by examiner

US 7,682,738 B2

LEAD ACID BATTERY WITH GELLED ELECTROLYTE FORMED BY FILTRATION ACTION OF ABSORBENT SEPARATORS AND METHOD FOR PRODUCING IT

BACKGROUND OF THE INVENTION

1. Field of the Invention

The invention relates to a new system for immobilizing electrolyte containing silica in lead acid batteries. This system relies on the use of silica particles from sources that have not been used in prior art electrolyte immobilizing systems and it also relies on the ability of separator materials and of the porous electrodes of the lead acid battery to filter silica particles from an electrolyte consisting of a mixture of sulfuric acid and silica particles. As a consequence of this filtering action there is a relative increase in the concentration of silica particles in the residual unfiltered electrolyte to levels at which gel formation occurs. In addition, gel formation can be caused to occur as a consequence of the increase in sulfate ion concentration in the electrolyte which occurs as the lead acid battery is being charged, either initially, after formation of positive and negative plates therein, or after use. Charging causes a rise in sulfate ion concentration in the electrolyte, which is accompanied by a rise of the specific gravity of the sulfuric acid electrolyte. This new method of immobilizing electrolyte is particularly suited for "VRLA" or valve regulated lead acid batteries which are sealed, especially those in which the plates are formed in the battery case.

2. Description of the Prior Art

Lead acid batteries of two distinct types are made; one type is known as a flooded battery and the other as a VRLA battery. In the former, the electrolyte is liquid sulfuric acid having a density of 1.220 to 1.320. When either of these types of battery is being charged, electrolytic decomposition of water releases oxygen gas at the positive electrodes and hydrogen gas at the negative electrodes. Hydrogen and oxygen that are released escape from a flooded battery, so that there is a loss of water from the electrolyte, necessitating its replacement. The electrolyte is immobilized in the VRLA battery, and a one-way valve prevents external gases from entering the battery. The valve will allow gas to escape from the interior of the battery when a certain internal pressure is exceeded. The immobilization of the electrolyte in a valve regulated lead acid battery makes it possible for the gases that are generated at one electrode to have access to the other electrode; as a consequence, oxygen gas travels inside the battery and is reduced at the surface of the negative plates and is returned to the electrolyte of the battery. This process, which is called the "Internal Oxygen Cycle", is the foundation of the operation of VRLA batteries. Unfortunately, even when the internal oxygen cycle is well established, some of the water is lost because the hydrogen gas generated at the negative electrodes cannot be oxidized at the positive electrodes and thus any hydrogen evolution means a corresponding loss of water.

In general, lead acid batteries have assemblies of alternating positive and negative plates with separator material between adjacent plates. The assemblies can be produced by assembling lead grids pasted with positive active material, lead grids pasted with negative active material, and separator material, making the necessary electrical connections, inserting the assembly into a case, and charging an electrolyte. The pasted lead grids must be converted to positive and negative battery plates. This is accomplished by what is called "formation", which involves passing an electric current through the assembly while it is in a suitable electrolyte, and can be carried out either in a tank before the assembly is inserted into its case, or in the case.

At least three methods are known for immobilizing the electrolyte in a VRLA battery, and page 80 of a publication which predates VRLA batteries, and is entitled *Electric Accumulators*, refers to a "jelly form of electrolyte due to Dr. Schoop [which] was made by adding dilute sulphuric acid to a solution of silicate of sodium" as one of two illustrations of the statement that "[a]ttention was at one time given to the production of solid accumulators . . . ." A first one of the methods for immobilizing the electrolyte in a VRLA battery involves the reaction of sulfuric acid with silica particles to form a silica gel. Examples of this involving the use of fumed silica can be found in U.S. Pat. No. 4,414,302, "Jache, et al." and other examples involving the use of colloidal silica can be found in U.S. Pat. No. 4,317,872, "Varma". According to another method, liquid electrolyte is immobilized when it is absorbed and retained in a very absorbent glass fiber mat separator. See, for example, U.S. Pat. No. 4,465,748, "Harris". In a third method, which is disclosed in U.S. Pat. No. 5,128,218, "Tokunaga et al.", fine silica particles are used in place of glass fiber separator.

Jache et al. discloses discharging a battery or a plate, either immediately after formation or after a charging of the final battery, so that sulfate anions from the sulfuric acid of the electrolyte are bonded to the electrodes as lead sulfate, removing at least a part of the electrolyte which remains in the battery, adding sulfuric acid and a gelling agent or sulfuric acid, a gelling agent and phosphoric acid to the electrolyte removed, and recharging the removed electrolyte plus the added sulfuric acid, gelling agent, and phosphoric acid, if any, to the battery. The amounts of the gelling agent, which can be silicic acid, and of sulfuric acid added to the removed electrolyte are sufficiently small that the electrolyte, when returned to the battery, does not gel until the battery is recharged, Upon recharging, however, the sulfate anions which had been bonded to the electrodes as lead sulfate are returned to the electrolyte, and raise the sulfate anion concentration enough that gelling of the electrolyte occurs. After slight drying, cracks form in the gel through which oxygen gas can be transported in the vapor phase for recombination.

Harris discloses a highly absorptive glass fiber separator for immobilizing the electrolyte in a VRLA battery wherein from 5 to 35% by weight of the fibers have a diameter of less than 1 μm.

Tokunaga et al. discloses a sealed tubular lead acid battery in which an absorbent separator is formed from fine primary particles of hydrous silicon dioxide. The Example of the patent describes the production of an assembly of positive plates, negative plates and "separators provided with projections", and insertion of the assembly into a container. The "separators provided with projections" are really spacers; they are positioned between the positive plates and the negative plates, and perform the function of positioning the plates relative to one another. They can be composed, the Example says, of a foamed phenolic material.

After the foregoing assembly is inserted into a container, the reference says, "a powder 8 (FIGS. 1 and 2) is packed both between the plates and around" the assembly. The "powder comprises fine primary particles of hydrous silicon dioxide diameters of 10-40 millimicrons and specific surface areas of 100-150 $m^2/g$. The primary particles agglomerate to form secondary particles with diameters of 50-200 microns. This powder is highly flowable and has an angle of repose of 25-30 degrees. Having such high fluidity, the powder can be closely packed into the container within a short time by applying vibrations with an amplitude of 1-2 mm under an acceleration of gravity of 2-4 g."

As noted above with reference to Jache et al., the immobilizing technique that involves the use of silica particles relies on the fact that, upon slight drying, the silicate gels that are formed crack and the oxygen gas is transported through the cracks for recombination.

Silica and sulfuric acid are the raw materials from which silica gels in batteries are produced. The following discussion reviews the characteristics of various types of silica that are used in lead acid batteries, as well as the current techniques used to produce silica gels. Silica is used both as the main ingredient in microporous polymer/silica separators and also as the gelling agent in immobilizing the electrolyte in an important segment of VRLA batteries.

In the microporous separator application, the silica used is dried precipitated silica. In the electrolyte gelling application, either colloidal silica or fumed silica, is added to cause sulfuric acid to gel. These silicas have properties which differ as a consequence of the processes used to make them. Precipitated silica is made by reacting sodium silicate (water glass) with sulfuric acid. As the reaction between the two ingredients proceeds, primary particles of the silicate are formed as distinct polymer chains that vary in length, depending on the precipitation reaction conditions.

Primary particles of silica have a great affinity for each other, they coalesce quickly into aggregates, which are not stable either, forming agglomerates of silica when they come together. These agglomerates are the silica particles that get separated from the reaction solution when precipitated silica is dried in either a kiln or in a spray drier.

The average agglomerate has a cross section of 10 to 20 microns, while aggregates are one order of magnitude smaller than agglomerates and primary particles of silica are from one to two orders of magnitude smaller than the aggregates.

Colloidal silica is a suspension of extremely fine amorphous silica particles in water. Colloids do not settle out of suspension over time. The highest concentration of commercially available colloidal silica is 50%. Silica colloids in colloidal silica have particle sizes generally in the range of 5 to 50 nanometers. Fumed silica is an amorphous form of silica formed by the combustion of silicon tetrachloride in hydrogen-oxygen furnaces. It is therefore very light and very fine. Primary particles of fumed silica typically have particle sizes of a few nanometers. Precipitated silica, as used herein, refers to amorphous silica that is precipitated from a solution.

BRIEF DESCRIPTION OF INVENTION

The instant invention is based upon the discovery of new ways for immobilizing electrolyte in lead acid batteries, especially VRLA batteries. An electrolyte is prepared from sulfuric acid and silica particles charged as "never dried precipitated silica slurry", a source that has not been used in prior art electrolyte immobilizing systems, and a part of the electrolyte is caused to gel by a process which involves, in a first case, filtering silica particles from part of the electrolyte by separator materials, porous electrodes, or both of lead acid batteries, which involves, in a second case, increasing the sulfate anion content of the electrolyte, or which involves, in a third case, both filtering silica particles from a part of the electrolyte and increasing the sulfate anion content of a part of the electrolyte. As a consequence of the filtering action there is an increase in the concentration of silica particles in the residual unfiltered electrolyte, which may be to a level sufficiently high to cause gel formation, or to a lower level that causes gel formation only after the sulfate anion content of the electrolyte is subsequently increased, for example as a consequence of the increase of sulfate anion content that occurs when the battery is charged. The increase in the sulfate anion content of the electrolyte that occurs during charging causes an increase in the specific gravity of the electrolyte.

"Never dried precipitated silica" is commercially available, both "milled" and "unmilled". It is a suspension of precipitated silica particles in water which is an intermediate product in the production of spray dried precipitated silica powders. The silica particles in milled never dried precipitated silica slurries typically have mean particle diameters that range from about 2-20 microns. The mean particle size of silica particles in unmilled slurries is typically from 10-25 microns.

In its essential details, one embodiment of the invention is a method for producing a lead acid battery that operates on the oxygen cycle. The method comprises the steps of:

assembling a cell comprising a pasted, unformed positive plate, a pasted, unformed negative plate, and separator material between the plates, wherein, the separator material constitutes an absorbent, porous, filtration medium, inserting the cell into a case in which there is free space between the case and the edges of the plates and the edges of the separator material, adjacent to the case, introducing into the case an electrolyte containing sulfuric acid having a given specific gravity and silica including at least about 0.5 percent by weight of silica from a never dried precipitated silica slurry, the mixture containing silica in a first, given concentration, which is below that which would cause sulfuric acid having the given specific gravity to gel, whereby sulfuric acid is absorbed into the plates and the absorbent, porous filtration medium of the separator material while silica is filtered out of that sulfuric acid, thereby increasing the concentration of silica in the sulfuric acid which remains in the space to a second concentration which is higher than the first concentration but is below the concentration which would cause the sulfuric acid in the mixture in the free space to gel, and increasing the specific gravity of the sulfuric acid in the cell, by charging the plate, to a concentration at which silica at the second concentration, causes gelation of the sulfuric acid in the free space.

In a second embodiment, the invention, in its essential details, is also a method for producing a lead acid battery that operates on the oxygen cycle. The second method involves the steps of:

assembling a cell comprising a pasted, unformed positive plate, a pasted, unformed negative plate, and separator material between the plates, wherein the separator material constitutes an absorbent, porous filtration medium and there is free space between surfaces of the separator and surfaces of the positive plates, inserting the cell into a case, introducing into the case sulfuric acid of a given, first specific gravity, and silica including at least 10 percent by weight of silica from a never dried precipitated silica slurry, the sulfuric acid in the case containing silica in a first, given concentration, which is below that which would cause sulfuric acid having the given specific gravity to gel, whereby sulfuric acid is absorbed into the plates and the absorbent, porous filtration medium of the separator material while silica is filtered out of that sulfuric acid, thereby increasing the concentration of silica in sulfuric acid which remains in the free space to a second concentration which is higher than the first concentration and is below the concentration which would cause the sulfuric acid in the mixture in the free space to gel, sealing the case, and increasing the specific gravity of the sulfuric acid in the cell, by forming the plates, to a concentration which, in combination with the second concentration of silica, causes gelatin of the sulfuric acid in the free space.

In a third embodiment, the invention is a method for producing a gelled lead acid battery that operates on the oxygen cycle, said method comprising the steps of:

assembling a cell comprising a positive plate which has been formed and dried, at least one negative plate which has been formed and dried, and separator material between the plates, wherein the separator material constitutes an absorbent porous filtration medium and is operable to leave free space between its surfaces and the surfaces of the plates;

inserting the cell into a case, introducing into the case a mixture of sulfuric acid of a given, first specific gravity, and silica including at least some silica from a never dried precipitated silica slurry, the mixture containing silica in a first, given concentration, which is below that which would cause sulfuric acid having the given specific gravity to gel, whereby sulfuric acid is absorbed into the plates and the absorbent porous filtration medium of the separator material while silica is filtered out of that sulfuric acid, thereby increasing the concentration of silica in the mixture which remains in the free space to a second concentration which causes the sulfuric acid in the mixture in the free space to gel, and sealing the case.

In a fourth embodiment, the invention is a method for producing a lead acid battery that operates on the oxygen cycle, said method comprising the steps of:

assembling a cell comprising a formed and dried positive plate, a formed and dried negative plate, and, between the plates, a sheet of separator material which is an absorbent, porous filtration medium, inserting the cell into a case so that there is free space between the case and the adjacent edges of the plates and of the separator material, introducing into the case a mixture of sulfuric acid and silica including at least about 0.5 percent by weight of silica from a never dried precipitated silica slurry, the mixture containing silica in a first, given concentration, which is below that which would cause sulfuric acid having the given specific gravity to gel, whereby sulfuric acid is absorbed into the plates and the absorbent, porous filtration medium of the separator material while silica is filtered out of that sulfuric acid, thereby increasing the concentration of silica in sulfuric acid which remains in the free space to a second concentration which is higher than the first concentration and is sufficiently high to cause the sulfuric acid in the mixture in the free space to gel.

A battery according to the invention can have either a flat or a tubular positive plate, the former being shown in FIG. 3 of U.S. Pat. No. 3,862,861, where flat negative and positive plates are designated 11, while the latter is shown in the drawing of U.S. Pat. No. 3,011,007.

Accordingly, it is a primary object of this invention to provide a method for producing a battery, particularly a VRLA battery with immobilized electrolyte.

It is a further object of the invention to provide a battery with a novel electrolyte, some of which is immobilized as a liquid in the active material and the separator of the battery and the rest of which is immobilized because it is gelled in free spaces between the separator and the positive plate or plates of a battery.

It is yet another object of the present invention to provide a new method for immobilizing electrolyte in a battery.

These and other important objects of this invention will become apparent to those skilled in the art from the following detailed description of the instant invention.

BRIEF DESCRIPTION OF THE DRAWING FIGURES

DETAILED DESCRIPTION OF THE INVENTION

Figure 1:
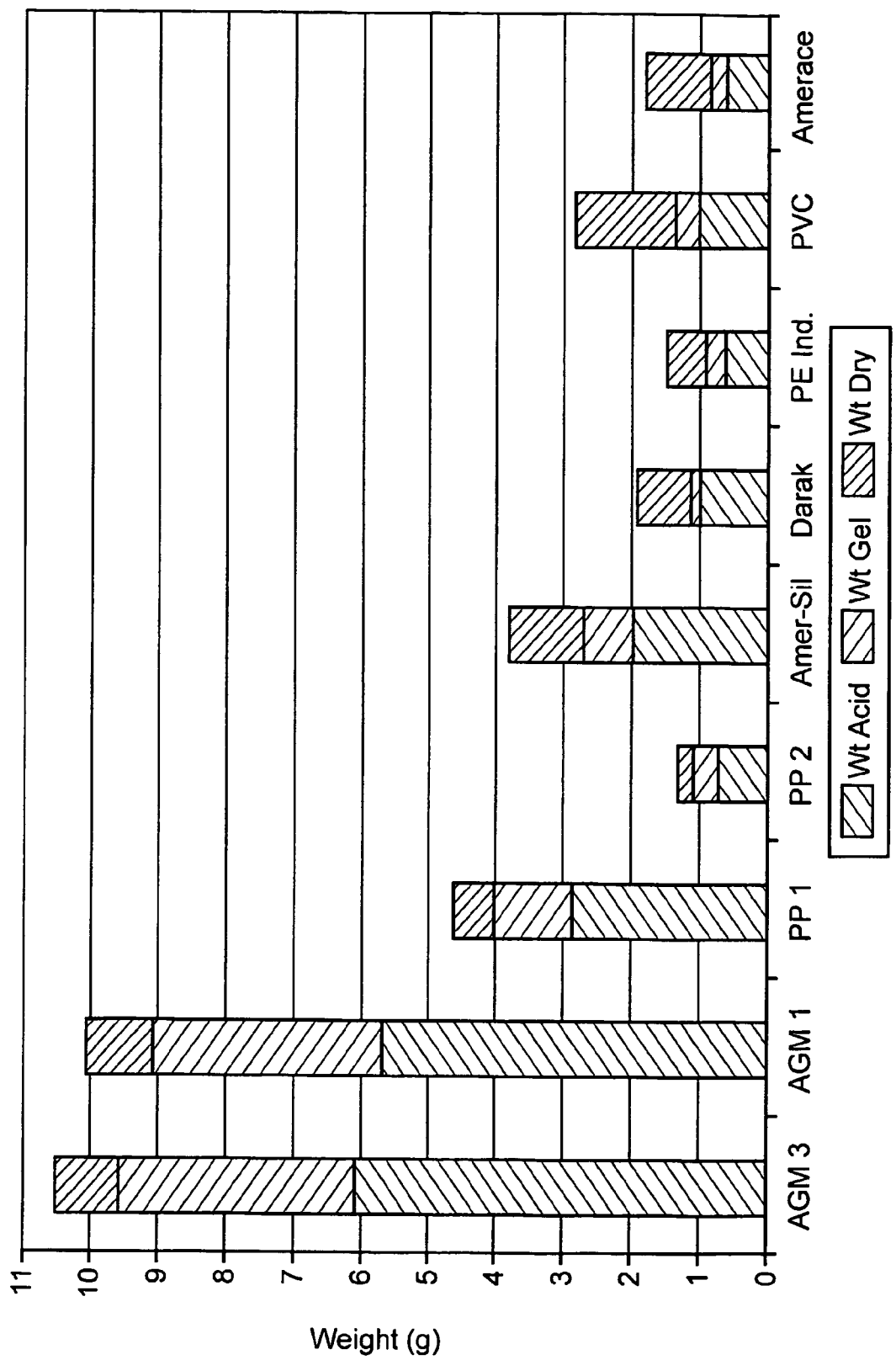
FIG. 1 is bar graph showing the dry weight of various separators, the amount of gel formed when end portions of the separators were dipped into sulfuric acid containing never dried silica slurry, and the weight of acid absorbed by the separators.

In one embodiment of the present invention, a silica-containing electrolyte is added to a cell or cells of a lead acid battery which contains sheets of a corrugated separator with surfaces which are separated from the electrodes of the battery so that there are free spaces between surfaces of the porous separators and the electrodes, and the battery is then processed to form a silica-containing gel in the free spaces. Example 1, below, describes the addition of a silica-containing electrolyte to such a battery, and processing of the battery to form a gel in the free spaces.

EXAMPLE 1

Thirty-three test batteries of type U2 (50 Ah) were made to illustrate how the present invention can be carried out on commercial battery making apparatus. Special absorbent separator/spacer material was prepared to produce these batteries. The separator/spacer spacer material was produced from an absorbent glass/synthetic fiber mat which had a surface area of 0.9 m$^2$/g, an average pore size of about 4 μm, a maximum pore size of about 25 μm, and contained 85% by weight of glass fibers and 15% by weight of organic fibers. The base material, which is commercially available from Hollingsworth & Vose Company under the designation "BG-089GB054", had a basis weight of 89 grams per square meter and a thickness at 10 kPa of about 0.54 mm. The base material was subjected to a corrugating process which involved saturating it with a 5% by weight aqueous solution of sodium silicate and, while it was wet with the sodium silicate solution, passing it through a set of metallic corrugating rolls. After drying, the separator material retained its corrugated form, even after saturation with electrolyte. The adjacent corrugations were about 4 mm apart; the overall thickness after corrugation was about 1.2-1.4 mm under 10 kPa.

The corrugated separator/spacer material was slit to the appropriate width and rolled, and the rolls were inserted into a machine for wrapping plates with separator and stacking the wrapped plates, i.e., a wrapper stacker machine, to produce the batteries of this Example. The machine cut the separator into sheets that were sized to be wrapped around the bottom of the positive plates and to cover both sides of the positive plates. Each cut sheet weighed approximately 5 grams. There were six cells in each battery, and each cell had five positive plates and six negative plates. Each battery contained about 150 grams of absorbent separator with a capacity of absorbing 1.2 kg of electrolyte.

The wrapping of the plates and the cast-on operations for these batteries were carried out on production equipment according to current practice for producing standard AGM batteries. When the corrugated absorbent separator/spacer was used on the wrapping machine and then on the cast-on machine, it was noticed that the separator/spacer corrugation was being compromised due to the high pressures that these machines exerted on the separator/spacer. When the test batteries were assembled, three different levels of pressure were exerted on the corrugated separator/spacers. Level 1 corresponded with the current level of pressure applied on standard absorbent separators and amounted to 18 units. Level 2 was a lower level of pressure than the normal machine settings and amounted to 10 units. Level 3, the lowest level, essentially zero pressure, amounted to 5 units and the batteries made at this level were hand assembled.

The electrolyte that was used in producing these batteries was prepared by mixing 42 kg of 1.275 specific gravity sulfuric acid and 18 kg of unmilled, never dried precipitated silica slurry, average particle size 12-17 microns The final specific gravity of the mix was 1.230 and the concentration of silica in the mix was 5 percent by weight.

The average dry weight of the Group U2 (50 Ah) batteries was 13.3 kg, whereas the average filled weight of the thirty-three batteries was 16.1 kg. Thus, the amount of electrolyte averaged 2.8 kg per battery. The separators of each battery absorbed 1.2 kg of that electrolyte, while roughly 1 kg was held and retained in the plates. The balance of the electrolyte, 0.6 kg, was not absorbed and was available for conversion to gelled electrolyte between the electrode and separator surfaces. The batteries were filled with electrolyte using a hand vacuum apparatus.

Eighteen of the test batteries were connected into one circuit, and were formed at 6.5 Amps for 48 hours for a total of 412 Ampere-hours. The electrolyte remained liquid during the most of the formation, gelling only at the very end of formation.

Three of the formed batteries were cut open, and all of the free unbound electrolyte was found to have gelled; the absorbent separators were completely soaked with electrolyte, and the positive plates were more than 95% formed.

Six of the test batteries were connected to a battery tester and were discharged at the one-hour discharge rate (20 Amps) until the terminal voltage reached 10.5 volts. The average capacity of all six batteries was 18.9 Amp-hours or 94.5%. This level of initial capacity is considered to be acceptable by battery manufacturers. Eight of the batteries subjected to life cycle testing for 200 cycles and were found to perform acceptably.

In another embodiment of the present invention, a silica-containing electrolyte is added to a case which contains a cell or cells of a lead acid battery in which the walls of the case are separated from the edges of the electrodes and separators of the battery so that there are free spaces between the interior walls of the battery case and the edges of the porous separators and the electrodes, and the battery is then processed to form a silica-containing gel in the free spaces. Example 2, below, describes the addition of a silica-containing electrolyte to such a battery, and processing of the battery to form a gel in the free spaces.

EXAMPLE 2

Six Group 24 monopoly VRLA batteries were produced and filled with sulfuric acid containing 1 percent by weight of silica from unmilled, never dried precipitated silica slurry. The batteries contained absorptive all glass mat separator grade BG26067 available from Hollingsworth & Vose Company. The separator surfaces were in direct contact with the plates. The fibers of the separator had a surface area of 1.0 M$^2$/g,. The separator had an average pore size of about 4-6 μm, and a maximum pore size of about 25 μm The batteries were container formed without any difficulty. They were discharged at the 20-minute rate and averaged about 23 minutes of discharge time. Later, the batteries were discharged at the 5-hour rate and performed normally, delivering about 105 percent of their rated capacity, on average. One of the batteries was opened, and normally saturated separators were found inside, i.e., the separator material was saturated with liquid electrolyte. A layer of gel was formed around the edges of the separators and the edges of the plates. All of the unabsorbed electrolyte was gelled with the consequence that there was no need to dump excess, unabsorbed electrolyte after the batteries were formed. This resulted in each battery having about 10 percent more acid, in gelled form, than a comparable battery made with silica free electrolyte from which unabsorbed electrolyte was dumped after formation.

In a third embodiment of the present invention, a silica-containing electrolyte was added to lead acid batteries which contained spacers separating surfaces of the separator from the electrodes of the battery so that there were free spaces between surfaces of the porous separators and the electrodes, and the battery was then processed to form a silica-containing gel in the free spaces. Example 3, below, describes the addition of a silica-containing electrolyte to such a battery, and processing of the batteries to form a gel in the free spaces.

EXAMPLE 3

Five factory produced Motive Power thirteen plate cells, capacity of 510 Ah (85 Ah per positive plate), were used in further investigation of the instant invention. The separator between the plates comprised of a layer of latex bonded 13 μm glass fiber veil having a nominal thickness of 0.38 mm adjacent to the positive plate, a spacer layer, nominal thickness 40 thousandths of an inch, of a polymeric netting that is available from Malted under the designation Malted 55-3757, positioned next to the veil, a layer of H&V Energy Guard ® BG 180GB117 glass/synthetic separator material, nominal thickness 1.17 mm, next to the netting, and a final spacer layer of Malted 55-3757 polymeric netting adjacent the negative plate.

Cell 1 was a control cell and was first used to determine the amount of electrolyte that would be absorbed by the separator and the active material in the cells. Cell 1 was filled with 5.35 liters of sulfuric acid having a specific gravity of 1.220. The unabsorbed sulfuric acid was dumped and was found to weigh 3.8 kg. It was calculated then that the plates and the separator had absorbed 2.7 kg of electrolyte. Later, Cell 1 was re-filled to contain a total of 5.35 liters of sulfuric acid having a specific gravity of 1.220. Cells 2 and 3 were filled with 5.5 liters of an electrolyte comprising sulfuric acid having a specific gravity of 1.220 and 3 percent by weight of precipitated silica from unmilled, never dried silica slurry containing twenty percent solids by weight. The electrolyte was prepared by mixing 85 percent by weight of sulfuric acid having a specific gravity of 1.255 with 15 percent by weight of never dried precipitated silica slurry at twenty percent solids. Cells 4 and 5 were filled with 5.5 liters of an electrolyte comprising sulfuric acid having a specific gravity of 1.220 and 4 percent by weight of precipitated silica from unmilled, never dried silica slurry containing twenty percent solids by weight. The electrolyte was prepared by mixing 85 percent by weight of sulfuric acid having a specific gravity of 1.280 with 20 percent by weight of unmilled, never dried precipitated silica slurry containing twenty percent solids.

Cells 1 through 5 were formed for 16 hours at 43 Amps, 24 hours at 77 Amps, 40 hours at 50 Amps and 16 hours at 25 Amps. The cells had 1.437 kg of positive active material per each positive plate and 1.065 kg of negative active material per each negative plate. The formation input was 4928 Ah for an average of 572 Ah per kg of positive active material.

Cell 1 formed well. Electrolyte was added to the cell during formation and, after formation, unabsorbed electrolyte, amounting to 2.1 liters and having a specific gravity of 1.270, was dumped from the cell. The negative plates were well formed and about 80% of the positive plates were covered with a layer of sulfate. The separators were removed and weighed and were found to have absorbed 7 times their dry weight of electrolyte.

Cells 2 and 3 formed well. Cell 2 was opened and found to contain 0.9 liter of unabsorbed, ungeled electrolyte having a specific gravity of 1.285. Gel had formed along the edges of the plates and layers of gel had formed on each side of the separator material. The negative plates were well formed and the positive plates were 90 percent covered by a thin layer of sulfate. The separators contained a layer of adsorbed gel and liquid electrolyte and had a weight of about ten times the dry weight of the separator. About 25 percent of the filling electrolyte wound up as a gel.

Cells 4 and 5 formed well. Cell 4 was opened and found to contain 0.5 liter of unabsorbed, ungeled electrolyte having a specific gravity of 1.305. Gel had formed along the edges of the plates; layers of gel had formed on each side of the separator material; and more gel was present in the elements than in Cell 2. The negative plates were well formed and the positive plates were 90 percent covered by a thin layer of sulfate. The separators contained a layer of adsorbed gel and liquid electrolyte and had a weight of about eleven times the dry weight of the separator. About 35 percent of the filling electrolyte wound up as a gel.

Experiments were performed to determine how much unmilled, never dried silica was necessary to cause gelling of cells produced with various separator materials, and the extent of formation of the plates. These experiments are described in Example 4, below.

EXAMPLE 4

Five separate experiments were conducted. Each experiment used laboratory cells made with 75 Ah Industrial pasted plates and various separator materials. The cells were filled with sulfuric acid electrolyte containing various percentages by weight of silica from unmilled, never dried silica slurries. The cells were charged to determine how silica content and separator materials would influence the gelling of electrolyte, according to the principals of this invention. Each cell comprised one positive plate and two negative plates.

In Cell I, the positive plate was pasted with 717 grams of positive active material and wrapped with separator material comprising two layers of Energy Guard ® BG180GB117 glass fiber separator, nominal thickness, at 10 kPa, of 1.17 mm, so that there was a double thickness of separator material on both major faces of the plate and on the bottom of the plate. Additional sheets of separator material were cut into pieces about the size of the plate and two sheets were positioned outside of the double layers on each face of the plate for a total of four glass fiber separator sheets adjacent each face of the positive plate. Sheets of ribbed veil, comprising Remay 2011 spunbond polyester at 25 $g/m^2$ with three extruded thermoplastic ribs per inch for a total thickness 0.8 mm, were cut into pieces about the size of the plate. Four cut sheets of ribbed veil material were positioned outside of the separator material on each face of the plate, to serve as spacers, with ribs running vertically.

The glass fiber separator material is available commercially from Hollingsworth & Vose Company. The rib veil material was produced by ITW Dynatech Inc., according to specifications provided by Hollingsworth & Vose Company, on a pilot facility using materials provided by Hollingsworth & Vose Company. It is an organic non-woven web with parallel ribs made by applying parallel, spaced-apart strips of a hot melt material to one side of the non-woven sheet.

The cut pieces of rib veil material were positioned against the glass fiber separator material, with the ribs on the outside. The two negative plates were pasted with 1298 grams of negative active material and assembled with the positive plates into a cell. Two ribbed veil sheets, nominal thickness 0.4 mm, were positioned outside of the negative plates. The cell was inserted into a case and an electrolyte was charged. The electrolyte charge was 1400 g, and consisted of sulfuric acid which contained 4% by weight of silica from never dried, unmilled, silica slurry that is commercially available from Rhodia in France. The specific gravity of the electrolyte was 1.235.

Cell 1 was formed at 3 Amps for 100 hours, i.e., 300 Ah. Electrolyte, a total of 379 grams, was lost during formation. After formation, the cell was torn down and it was determined that the plates held and retained 307 grams of electrolyte. The glass fiber separator held and retained 280 grams of electrolyte. The spacers held and retained 209 grams of electrolyte and there was unretained, liquid electrolyte in the amount of 225 grams. After formation, the unretained electrolyte had a specific gravity of 1.250. The positive plate was 80% formed and the negative plate was poorly formed. The electrolyte that was not absorbed and retained in the plates and the glass fiber separator, i.e., the free, unretained electrolyte, contained silica at a level of 9% by weight. It was observed that no gel formed in the cell, which was, therefore, outside of the present invention. The electrolyte that was retained in the separator had a specific gravity of 1.290 after formation.

In Cell II, the positive plate was pasted with 700 grams of positive active material and wrapped with separator material comprising two layers of Energy Guard® glass fiber separator, nominal thickness, at 10 kPa, of 1.17 mm, so that there was a double thickness of separator material on both major faces of the plate and on the bottom of the plate. Additional sheets of separator material were cut into pieces about the size of the plate and six sheets were positioned outside of the double layers on each face of the plate for a total of eight glass fiber separator sheets adjacent each face of the positive plate. Sheets of rib veil, thickness 0.8 mm, were also cut into pieces about the size of the plate and six cut sheets of rib veil material were positioned outside of the separator material on each face of the plate, to serve as spacers.

The cut pieces of ribbed veil material were positioned against the glass fiber separator material, with the ribs on the outside. The two negative plates were pasted with 1357 grams of negative active material and assembled with the positive plates into a cell. The cell was inserted into a case and electrolyte (1500 grams) was added to the cell. The electrolyte had a specific gravity of 1.235 and contained 6% by weight of silica from never dried, unmilled, silica slurry.

Cell II was formed at 3 Amps for 150 hours, i.e., 450 Ah. During formation, 299 grams of electrolyte were lost. After formation, the plates held and retained 333 grams of electrolyte. The glass fiber separator held and retained 482 grams of electrolyte. The spacers held and retained 102 grams of electrolyte and there was unretained, liquid electrolyte in the amount of 100 grams. After formation, the cell was torn down and it was determined that the unretained electrolyte had a specific gravity of 1.28. The positive plate and the negative plates were dry and poorly formed. The electrolyte that was not absorbed in the plates and the glass fiber separator, i.e., the free electrolyte contained silica at a level of 15% by weight. It was observed that 185 grams of gel was formed from the free electrolyte. Thus, gel was formed in accordance with the present invention. The electrolyte that was retained in the separator had a specific gravity of 1.290 after formation.

In Cell III, the positive plate was pasted with 721 grams of positive active material and wrapped with separator material comprising two layers of Energy Guard™ glass fiber separator, nominal thickness, at 10 kPa, of 1.2 mm, so that there was a double thickness of separator material on both major faces of the plate and on the bottom of the plate. Additional sheets of separator material were cut into pieces about the size of the plate and four sheets were positioned outside of the double layers on each face of the plate for a total of six glass fiber separator sheets adjacent to each face of the positive plate. Sheets of rib veil, thickness 0.8 mm, were also cut into pieces about the size of the plate and four cut sheets of rib veil material were positioned outside of the separator material on each face of the plate, to serve as spacers. In addition, several glass rods having a diameter of 3/16 inch were inserted between the positive plate and the adjacent layer of separator material, to serve as secondary spacers. The glass rods were oriented vertically, like the ribs on the rib veil material.

The cut pieces of rib veil material were positioned against the glass fiber separator material, with the ribs on the outside. The two negative plates were pasted with 1311 grams of negative active material and assembled with the positive plate into a cell. The cell was inserted into a case and 1300 grams of electrolyte were added to the cell. The electrolyte had a specific gravity of 1.235 and contained 2% by weight of silica from never dried, unmilled, silica slurry.

Cell III was formed at 3 Amps for 150 hours, i.e., 450 Ah. During formation, 236 grams of electrolyte were lost. After formation, the plates held and retained 278 grams of electrolyte. The glass fiber separator held and retained 490 grams of electrolyte. The rib veil spacers held and retained 31 grams of electrolyte and there was unretained liquid electrolyte in the amount of 465 grams. After formation, the cell was torn down and it was determined that the unretained electrolyte had a specific gravity of 1.25. The positive plate and the negative plates were 100 percent formed and the formation was good. The electrolyte that was not absorbed in the plates and the glass fiber separator, i.e., the free electrolyte, contained silica at a level of 4% by weight. It was observed that no gel was formed from the free electrolyte. The cell was, therefore, outside of the present invention. The electrolyte that was retained in the separator had a specific gravity of 1.285 after formation.

In Cell IV, the positive plate was pasted with 721 grams of positive active material and wrapped with separator material comprising two layers of Energy Guard™ glass fiber separator, nominal thickness, at 10 kPa, of 1.2 mm, so that there was a double thickness of separator material on both major faces of the plate and on the bottom of the plate. Additional sheets of separator material were cut into pieces about the size of the plate and four sheets were positioned outside of the double layers on each face of the plate for a total of six glass fiber separator sheets adjacent each face of the positive plate. Sheets of rib veil, thickness 0.8 mm, were also cut into pieces about the size of the plate and four cut sheets of rib veil material were positioned outside of the separator material on each face of the plate, to serve as spacers. In addition, several glass rods having a diameter of 3/16 inch were inserted between the positive plate and the adjacent layer of separator material, to serve as secondary spacers. The glass rods were oriented vertically, like the ribs on the rib veil material.

The cut pieces of rib veil material were positioned against the glass fiber separator material, with the ribs on the outside. The two negative plates were pasted with 1333 grams of negative active material and assembled with the positive plates into a cell. The cell was inserted into a case and electrolyte (1300 grams) was added to the cell. The electrolyte had a specific gravity of 1.235 and contained 3% by weight of silica from never dried, unmilled, silica slurry.

Cell IV was formed at 3 Amps for 150 hours, i.e., 450 Ah. During formation, 225 grams of electrolyte were lost. After formation, the cell was torn down and it was determined that the plates held and retained 280 grams of electrolyte. The glass fiber separator held and retained 517 grams of electrolyte. The rib veil spacers held and retained 32 grams of electrolyte and there was unretained liquid electrolyte in the amount of 246 grams. After formation, the unretained electrolyte had a specific gravity of 1.27. The positive plate and the negative plates were 100 percent formed and the formation was good. The electrolyte that was not absorbed in the plates and the glass fiber separator, i.e., the free electrolyte, contained silica at a level of 8% by weight. It was observed that no gel was formed from the free electrolyte. The cell was, therefore, outside of the present invention. The electrolyte that was retained in the separator had a specific gravity of 1.290, after formation.

In Cell V, the positive plate was pasted with 745 grams of positive active material. Two novel separators including spacers were prepared from Energy Guard™ glass fiber separator, nominal thickness, at 10 kPa, of 0.6 mm. A first, rigid corrugated separator/spacer was prepared by immersing glass fiber separator in a ten percent by weight aqueous solution of sodium silicate and passing the wet sheet between opposed metallic corrugating rollers. Then the corrugated wet sheet was dried. It retained its corrugated form and had a nominal thickness of 1.6 mm at a pressure of 10 kPa. A second, softer corrugated separator/spacer was prepared by immersing glass fiber separator in a five percent by weight aqueous solution of s sodium silicate and passing the wet sheet between opposed metallic corrugating rollers. The corrugated wet sheet was dried. It retained its corrugated form, but it was softer and more pliable than the first, rigid corrugated separator spacer. It had a nominal thickness of 1.4 mm at a pressure of 10 kPa. The corrugations were spaced from one another by about mm.

The rigid and the soft corrugated separator spacer materials were cut into sheets corresponding in size with the plates of the cell. Four cut sheets of the rigid corrugated separator were positioned on each side of the positive plate. Six cut sheets of soft corrugated separator spacer were positioned next to the outer sheets of rigid corrugated separator spacer cut sheets for a total of ten sheets adjacent each face of the positive plate.

The two negative plates were pasted with a total of 1374 grams of negative active material and assembled with the positive plate into a cell. The cell was inserted into a case and electrolyte (1200 grams) was added to the cell. The electrolyte had a specific gravity of 1.225 and contained 5% by weight of silica from never dried, unmilled, silica slurry.

Cell V was formed at 3 Amps for 150 hours, i.e., 450 Ah. During formation, 293 grams of electrolyte were lost. After formation, the cell was torn down and it was determined that the plates held and retained 286 grams of electrolyte. The corrugated separator spacer material held and retained 491 grams of electrolyte. There was no unretained liquid electrolyte. The positive plate and the negative plates were 100 percent formed and the formation was good. The electrolyte that was not absorbed in the plates and the corrugated separator spacer contained silica at a level of 14% by weight. It was observed that 130 grams of gel was formed from the free electrolyte. The electrolyte in the cell gelled according to the present invention. The electrolyte that was held and retained in the pores of the corrugated separator spacer had a specific gravity of 1.285, after formation.

EXAMPLE 5

Additional cells were produced, starting with UPS battery U2 50 Ah cells containing pasted but unformed plates. The cells were removed from their cases and the original, conventional separators were removed. These cells comprised five positive plates and six negative plates.

In Cell I of Example 5, conventional separator weighing 42.8 grams was removed and replaced with 40 grams of modified Energy Guard® glass fiber separator, nominal thickness at 10 kPa of 1.35 mm. The separator was that identified above, except that it was modified to include integral spacers consisting of ribs, which were added to the separator by laying down lines of hot-melt material, applied in parallel spaced relationship to each other, on one side of the separator. The separator was cut into sheets that were sized so that the sheets could be wrapped around the bottom of the positive plates and cover both sides. Single sheets of separator were wrapped around each of the positive plates, with the ribs facing the positive plate and oriented vertically.

The cell was inserted into a case and an electrolyte (580 grams), specific gravity 1.24, containing 4 percent by weight of silica from an unmilled, never dried silica slurry, was added to the cell. The cell was formed for 46 hours at a rate of 6.5 Amperes to an end voltage of 1.70 volts, for a total of 299 Ah. The cell was then discharged for six hours at 7.5 Amperes and gave a yield of 36.7 Ah. This corresponds to 83.5% of rated capacity. The cell was then recharged for about 31 hours at a rate of 2 Ah. This cell had good capacity but, when torn down, was found to contain no gelled electrolyte and was not, therefore, in accordance with the present invention.

In Cell 2 of Example 5, conventional separator weighing 43 grams was removed and replaced with 46.9 grams of modified Energy Guard™ glass fiber separator, nominal thickness at 10 kPa of 1.90 mm. The separator was modified to include spacers consisting of ribs, which were added to the separator by laying down lines of hot-melt material, applied in parallel spaced relationship to each other, on one side of the separator. The hot melt was softer, when cooled, than the hot melt used in connection with Cell I of Example 5. The separator was cut into sheets that were sized so that the sheets could be wrapped around the bottom of the positive plates and cover both sides. Single sheets of separator were wrapped around each of the positive plates, with the ribs facing the positive plate and oriented vertically.

The cell was inserted into a case and electrolyte (510 grams), specific gravity of 1.24, containing 3 percent by weight of silica from an unmilled, never dried silica slurry, was added to the cell. The cell was formed for 46 hours at a rate of 6.5 Amperes for a total of 299 Ah. The cell was then discharged for six hours at 7.5 Amperes to an end voltage of 1.70 volts. It gave a capacity of 31.5 Ah, corresponding to 72% of rated capacity. The cell was recharged for about 21 hours at a rate of 2 Amperes and discharged a second time for six hours at a rate of 7.5 Amperes. At this point, the cell had a capacity of 35.1 Ah and was producing 75% of rated capacity. The cell was once again recharged for about 21 hours at a rate of 2 Amperes and discharged a third time for six hours at a rate of 7.5 Amperes. At this point, the cell had a capacity of 35.4 Ah and was again producing 75% of rated capacity. The cell was recharged for about 21 hours at a rate of 2 Amperes and discharged a fourth time for six hours at a rate of 7.5 Amperes to 1.70 volts. At this point, the cell had a capacity of 36.4 Ah and was producing 83.3% of rated capacity. The cell was recharged for about 21 hours at a rate of 2 Amperes and discharged a fifth time for six hours at a rate of 7.5 Amperes. At this point, the cell had a capacity of 36 Ah and was producing 76% of rated capacity. The cell was recharged for about thirty hours at the rate of 2 Amperes and discharged a sixth time, for twenty hours, at a rate of 2.5 Amperes (20 hr rate). At this point, the cell had a capacity of 45 Ah and was producing 90% of rated 20 hr capacity of 50 Ah. The cell was torn down and it was determined that the plates held and retained 156 grams of electrolyte. The glass fiber separator held and retained 281.4 grams of electrolyte and lost electrolyte amounted to 54.5 grams. There was no unretained, liquid electrolyte in the cell. The positive plates and the negative plates were well formed. The electrolyte that was not absorbed and retained in the plates and the glass fiber separator, amounting to 18.1 grams, contained silica at a level of 21% by weight and was completely gelled in accordance with the present invention. The electrolyte that was retained in the separator had a specific gravity of 1.290.

In Cell 3 of Example 5, conventional separator weighing 43.3 grams was removed and replaced with 50.4 grams of Energy Guard™ glass fiber separator, nominal thickness at 10 kPa of 1.90 mm, modified as described above in connection with Cell 2 of Example 5. The separator was cut into sheets that were sized so that the sheets could be wrapped around the bottom of the positive plates and cover both sides. Single sheets of separator were wrapped around each of the positive plates, with the ribs facing the positive plate and oriented vertically.

The cell was inserted into a case and electrolyte (576 grams), specific gravity of 1.23, containing 4 percent by weight of silica from an unmilled, never dried silica slurry, was added to the cell. The cell was formed for 46 hours at a rate of 6.5 Amperes for a total of 299 Ah. The cell was then discharged for twenty hours at the rate of 2.5 Amperes (20 hr. rate). It gave a capacity of 41.5 Ah, corresponding to 82% of rated voltage. The cell was recharged for about thirty hours at the rate of 2 Amperes and discharged a second time, for twenty hours, at a rate of 2.5 Amperes (20 hr. rate). At this point, the cell had a capacity of 42.5 Ah and was producing 85% of rated 20 hr capacity of 50 Ah. The cell was torn down and it was determined that the plates held and retained 99 grams of electrolyte. The glass fiber separator held and retained 233.9 grams of electrolyte; lost electrolyte amounted to 208.8 grams. There was no unretained, liquid electrolyte in the cell. The positive plates and the negative plates were well formed. The electrolyte that was not absorbed and retained in the plates and the glass fiber separator, amounting to 34.3 grams, contained silica at a level of 10% by weight and it was completely gelled in accordance with the present invention. The electrolyte that was retained in the separator had a specific gravity of 1.285.

In Cell 4 of Example 5, conventional separator weighing 41.7 grams was removed and replaced with 22.3 grams of Energy Guard™ glass fiber separator, nominal thickness at 10 kPa of 1.0 mm and a spacer comprising rib veil material described above, nominal thickness 0.8 mm. The separator and the spacer were cut into sheets that were sized so that the sheets could be wrapped around the bottom of the positive plates and cover both sides. Sheets of rib veil were wrapped around each of the positive plates, with the ribs facing the positive plate and oriented vertically. Separator sheets were wrapped around the spacer covered plates.

The cell was inserted into a case and electrolyte (550 grams), specific gravity of 1.235, containing 3 percent by weight of silica from an unmilled, never dried silica slurry, was added to the cell. The cell was formed for 46 hours at a rate of 6.5 Amperes for a total of 299 Ah. The cell was then discharged for twenty hours at the rate of 2.5 Amperes (20 hr. rate). It gave a capacity of 40 Ah, corresponding to 80% of rated voltage. The cell was recharged for about thirty hours at the rate of 2 Amperes and discharged a second time, for twenty hours, at a rate of 2.5 Amperes (20 hr. rate). At this point, the cell had a capacity of 44 Ah and was producing 88% of rated 20 hr capacity of 50 Ah. The cell was torn down and it was determined that the plates held and retained 170 grams of electrolyte. The glass fiber separator held and retained 214 grams of electrolyte and lost electrolyte amounted to 136 grams. There was no unretained, liquid electrolyte in the cell. The positive plates and the negative plates were well formed. The electrolyte that was not absorbed and retained in the plates and the glass fiber separator, amounting to 30 grams, contained silica at a level of 10% by weight and it was completely gelled in accordance with the present invention. The electrolyte that was retained in the separator had a specific gravity of 1.285.

In Cell 5 of Example 5, conventional separator weighing 43 grams was removed and replaced with 39.6 grams of a non-absorbent, microporous polyethylene industrial separator that is commercially available from Daramic, nominal thickness of 1.3 mm. The separator was cut into sheets that were sized so that the sheets could be wrapped around the bottom of the positive plates and cover both sides. Separator sheets were wrapped around the positive plates.

The cell was inserted into a case and electrolyte (550 grams), specific gravity of 1.235, containing 4 percent by weight of silica from an unmilled, never dried silica slurry, was added to the cell. The cell was formed for 46 hours at a rate of 6.5 Amperes for a total of 299 Ah. The cell was torn down and it was determined that the pores of the separator material had become completely blocked with silica and that the plates were not properly formed. Thus, this cell was not in accordance with the present invention.

EXAMPLE 6

Additional cells were produced, starting with UPS monobloc U2 50 Ah cells containing pasted but unformed plates. The cells were removed from their cases and the original, conventional separators were removed. These cells comprised five positive plates and six negative plates.

In Cell 1 of Example 6, conventional separator weighing 43.2 grams was removed and replaced with 40.4 grams of the second, softer, corrugated separator/spacer described above in connection with Cell 5 of Example 4, nominal thickness at 10 kPa of 1.4 mm. The separator/spacer was cut into sheets that were sized so that the sheets could be wrapped around the bottom of the positive plates and cover both sides. Single sheets of separator were wrapped around each of the positive plates with the corrugations oriented vertically.

The cell was inserted into a case and electrolyte (550 grams), specific gravity of 1.235, containing 5 percent by weight of silica from an unmilled, never dried silica slurry, was added to the cell. The cell was formed for 46 hours at a rate of 6.5 Amperes to an end voltage of 1.70 volts, for a total of 299 Ah.

The cell was torn down and it was determined that the plates held and retained 115 grams of electrolyte. The glass fiber separator/spacer held and retained 214 grams of electrolyte and lost electrolyte amounted to 171 grams. There was no unretained, liquid electrolyte in the cell. The positive plates were ninety percent formed and the negative plates were one hundred percent formed. The electrolyte that was not absorbed and retained in the plates and the glass fiber separator/spacer, amounting to 50 grams, contained silica at a level of 13% by weight and it was completely gelled in accordance with the present invention.

In Cell 2 of Example 6, conventional separator weighing 43.3 grams was removed and replaced with 60.8 grams of the first, rigid, corrugated separator/spacer material described above in connection with Cell 5 of Example 4, nominal thickness at 10 kPa of 1.6 mm. The separator/spacer was cut into sheets that were sized so that the sheets could be wrapped around the bottom of the positive plates and cover both sides. Single sheets of separator were wrapped around each of the positive plates with the corrugations oriented vertically.

The cell was inserted into a case and electrolyte (550 grams), specific gravity of 1.235, containing 5 percent by weight of silica from an unmilled, never dried silica slurry, was added to the cell. The cell was formed for 46 hours at a rate of 6.5 Amperes to an end voltage of 1.70 volts, for a total of 299 Ah. During formation, an addition of 50 grams of water was made to the cell.

The cell was torn down and it was determined that the plates held and retained 151 grams of electrolyte. The glass fiber separator/spacer held and retained 262 grams of electrolyte and there was a loss of 182 grams of electrolyte. There was no unretained, liquid electrolyte in the cell. The positive plates were eighty percent formed and the negative plates were one hundred percent formed. The electrolyte that was not absorbed and retained in the plates and the glass fiber separator/spacer, amounting to 5 grams, contained silica at a level of 1% by weight and it was completely gelled in accordance with the present invention. Because of the very small amount of unabsorbed electrolyte, this cell is deemed to be outside the scope of the present invention. In this example, batteries made from two versions of corrugated absorbent separator, a soft version with low sodium silicate content and a rigid version with high sodium silicate content, were electro-formed with different results. The cell containing the soft corrugated separator generated 10 times more gel than the cell containing the rigid version. This is because the soft corrugated separator absorbed 5.4 times its weight in electrolyte, whereas the rigid version absorbed only 4.3 times its weight in acid. This difference in absorbency explains the different results obtained in the electro-formation of the cell.

It will be appreciated from the foregoing examples that, in one embodiment of the instant invention, there is a free space between a surface of a separator and an adjacent surface or facing surface of an electrode, preferably of a positive electrode, which can be can be a pasted and dried battery plate or tubular positive electrode or a pasted but unformed battery plate or a tubular positive electrode, and that the concentration of silica particles in the electrolyte, and the concentration of sulfate ions in the electrolyte, are controlled to prevent premature gel formation. In another embodiment, of the instant invention, there is a free space between the interior of a battery case and end surfaces of separator material and end surfaces of electrodes, preferably positive electrodes, which can be can be pasted and dried battery plates or tubular positive electrodes, or pasted but unformed battery plates or tubular positive electrodes, and that, again, the concentration of silica particles in the electrolyte, and the concentration of sulfate ions in the electrolyte, are controlled to prevent premature gel formation.

As the electrolyte containing silica particles is added to the battery, a portion of the electrolyte is absorbed into the electrodes (plates or tubular electrodes) and the separator material. Silica particles are filtered from the portion of the electrolyte so absorbed, so that electrolyte free of silica is absorbed by and retained in the porous electrodes (plates or tubular electrodes) and the separators, where it is immobilized primarily as a liquid. Therefore, the unabsorbed electrolyte in the free spaces between the separator and the electrodes inside the cell or cells of the battery, has a higher concentration of silica particles than did the electrolyte that was added to the battery.

Since the electrolyte containing little or no silica is absorbed by the porous components of the cell, the concentration of the silica particles in the free or unbound portion of the electrolyte is increased. The system is controlled so that the silica particle concentration of the free and unbound electrolyte is kept below the critical concentration that would allow gel formation, in the case of batteries made with unformed plates, and at or just below the critical concentration that would allow gel formation in the case of batteries made with formed and dried plates or tubular electrodes.

Because the gelling of silica-containing electrolyte can be controlled according to this invention so that it does not gel prematurely, the lead-acid battery can undergo electro-formation by a standard process.

As the electro-formation proceeds, the concentration of the electrolyte is rising and, hence, the silica-containing electrolyte will gel as the critical concentration for the sulfuric silica gel is reached for the higher silica concentration electrolyte. In other words, whereas gel formation for a given silica concentration does not happen readily at lower sulfuric acid densities, gel formation is possible, at that silica concentration, when higher sulfuric acid densities are reached towards the end of the electro-formation process.

In the case of a battery assembled with pre-formed and dried plates, the gel formation will occur in a slightly different manner. When charged and dried plates are used in the assembly of a battery, the filling electrolyte density will not change very much when the battery is charged. During electro-formation, the electrolyte specific gravity increases by as much as 0.060 whereas, when the battery is assembled with pre-formed, dried plates or tubular electrodes, the specific gravity of the sulfuric acid increases only about one fourth of that amount, or, 0.015. The implication of this lack of large increase in the specific gravity of the battery electrolyte is that the major mechanism for gel creation is the filtration action of the absorbent separators and electrodes.

Turning now to the separators which are useful in the instant invention, the two attributes that are required for good performance of absorbent separators are high void volume (low solidity), to give the separator the capacity to absorb and hold a large quantity of electrolyte, and small pore diameter, to render the separator effective to filter silica particles from absorbed electrolyte. Void volume and pore size may be related, but they are definitely not the same thing. Although there are many modes and theories of filtration, in dealing with liquid filtration, as opposed to gas filtration, it must be realized that the viscous forces will usually overwhelm the relatively small Van der Waals forces between the particles and the filter. In addition, there are usually ionic double layer forces between the particles and the filter, which are in fact repulsive. Thus, the primary mode of action in liquid filtration is the simple process of sieving. That is, the fibrous mat which is the filter basically is a screen or pore structure, which will prevent particles larger than the pore diameter from passing into or through the filter. Of course, both the particle size distribution and the pore size distribution are quite broad, but nonetheless, an effective filter mat requires pores that are smaller than the particles that are being filtered. It can be demonstrated, both theoretically and experimentally, that, for a fibrous mat, the mean pore size is directly proportional to the size of the fiber.

By definition, half of the flow passing through a filter layer passes through pores larger than the mean flow pore diameter, and half of the flow passes through pores smaller than the mean flow pore diameter. Thus, half the particles that are larger than the mean flow pore diameter will be stopped by the first thickness of effective filtration and half will penetrate. The second thickness of effective filtration will permit 50% of the penetrating 50% to penetrate, and so on, with a smaller and smaller fraction of those particles whose diameter is equal to the mean flow pore diameter being able to penetrate into or through the web. Thus, a fibrous web can effectively exclude particles that are larger than the mean flow pore diameter.

Separator materials, which are suitable for use in the present invention, have pores that are sized so that silica particles will be filtered from electrolyte that is absorbed in the separators. Especially suitable separator materials are porous, fibrous, non-woven mats and, in particular, absorbent glass mats (AGM). The pore size of the absorbent separator must be small enough to filter silica particles from the electrolyte and should be in the range of 0.1 to 20 microns. It is preferred that the pore size of the absorbent separator range from 1 to 10 microns and, more preferably, from about 3 to 8 microns. Absorbency is another critical requirement for absorbent separator for use in the present invention. Absorbent separators made up of inorganic or organic materials that can absorb at least three times their weight are especially good materials for use in this invention. Absorbent separators that can absorb five or more times their weight of sulfuric acid are preferred. It is also possible to use separators that are composites of microporous materials and highly absorbent fibrous separator materials.

Figure 2:
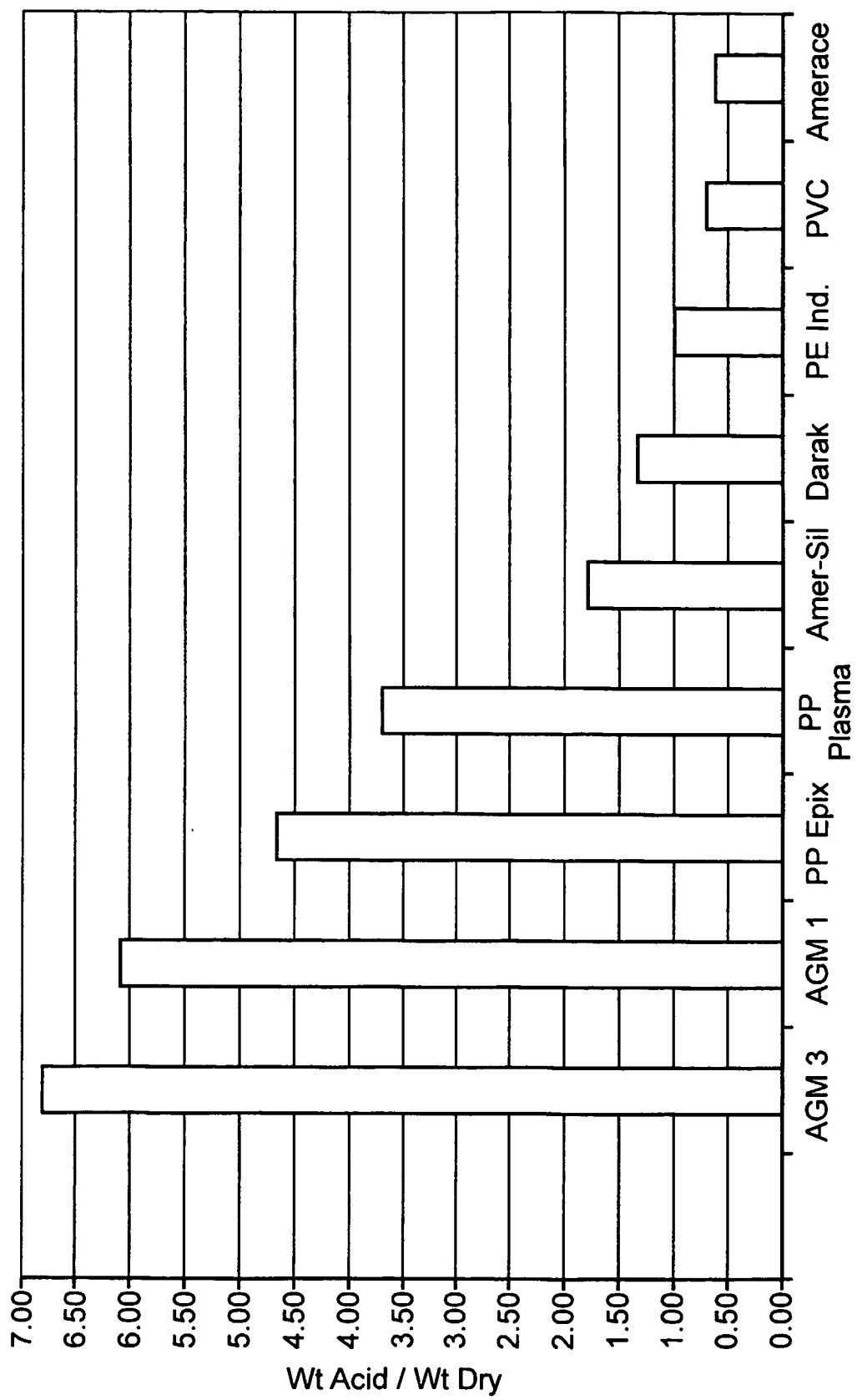
FIG. 2 is a bar graph showing the absorbency of various separator materials for sulfuric acid.

FIGS. 1 and 2 illustrate the results of wicking tests performed on various conventional battery separator materials. For each test, a strip of material was cut into a strip 2.5 cm wide and 15 cm long, and weighed. One end of the strip was plunged into 100 grams of sulfuric acid having a specific gravity of 1.240 containing 3 percent by weight of silica from never dried precipitated silica slurry. The strips were suspended so that 1 cm of each strip was submerged in the sulfuric acid. The strips were taken down after 24 hours and the weight of sulfuric acid that was absorbed by the strip was determined.

The strip identified as AGM 3 is the previously identified Energy Guard®, which is available from Hollingsworth & Vose Company, an absorbent glass mat with about 15 percent by weight of organic fibers. The strip identified as AGM 1 is Grade 065 separator from Hollingsworth & Vose, an absorbent all glass mat separator. The strip identified as PP Epix™, which is available from Ebara as an ion exchange filter medium is a polypropylene/polyethylene bi-component fiber sheet that is grafted with acrylic acid via electron-beam radiation. The strip identified as PP Plasma is a spun-laced polypropylene/polyethylene bi-component fiber sheet that is treated by oxygen plasma. The strip identified as Amer-Sil is a microporous PVC/silica sheet available from Amer-Sil. The strip identified as Darak™ is Darak 5000, a brand of microporous battery separator available from Daramic, which comprises a polyester mat embedded with a phenol-formaldehyde-resorcinol resin with ribs. The strip identified as PE Ind. is a microporous polyethylene industrial separator that is available from Daramic, nominal thickness of 1.3 mm. The strip identified as PVC is available from Amer-Sil. The strip identified as Amerace is a FLEX-FIL™ latex separator.

Referring now to FIG. 1, each piece of separator was weighed before the test described above; the top portion of each bar graph represents the weight of the separator strip. In each case, the separator absorbed a quantity of sulfuric acid and the bottom portion of each bar graph represents the weight of absorbed acid. Also, in each case, a quantity of sulfuric acid silica gel formed on the end of the separator strip. The middle portion of each bar graph indicates the weight of the gel that was formed. Clearly, the absorbent glass mat absorbed the most electrolyte. It is also clear that much more gel was formed on the end of the absorbent glass mats than on any other separator material. It appears that, as sulfuric acid was absorbed into the separator, silica particles were filtered out of that sulfuric acid and that the concentration of silica particles increased, in the region around the submerged end of the separator material, from 3 percent, which is too low to cause gelling, to a concentration which causes gelling. The other separator materials exhibited this phenomenon, but to a much lesser extent. This test clearly shows the superiority of the absorbent glass mat materials in promoting gelling through filtration of silica particles. All the other materials tested can also generate gel through silica particle concentration enhancement, but to a much lesser extent. It is possible to combine one or two of these materials to achieve acceptable absorption and filtration properties for the present invention.

Referring now to FIG. 2, this bar graph illustrates the weight of the sulfuric acid that was absorbed through one end of the strip in twenty-four hours, divided by the weight of the dry separator. Absorbent glass mat absorbed over six times its weight in acid. The polypropylene separators absorbed about four times their weight in acid while the other separator materials absorbed less than twice their weight in acid.

In case it is desired to form a gel adjacent to the active materials on the electrodes, a free space is necessary between the separators and the electrodes, where the gel is desired. This free space is helpful during the battery filling operation, to facilitate the ingress of electrolyte, and it is also essential in order to provide a layer of immobilized electrolyte as a gel against the active materials of the electrodes, if desired.

Figure 3:
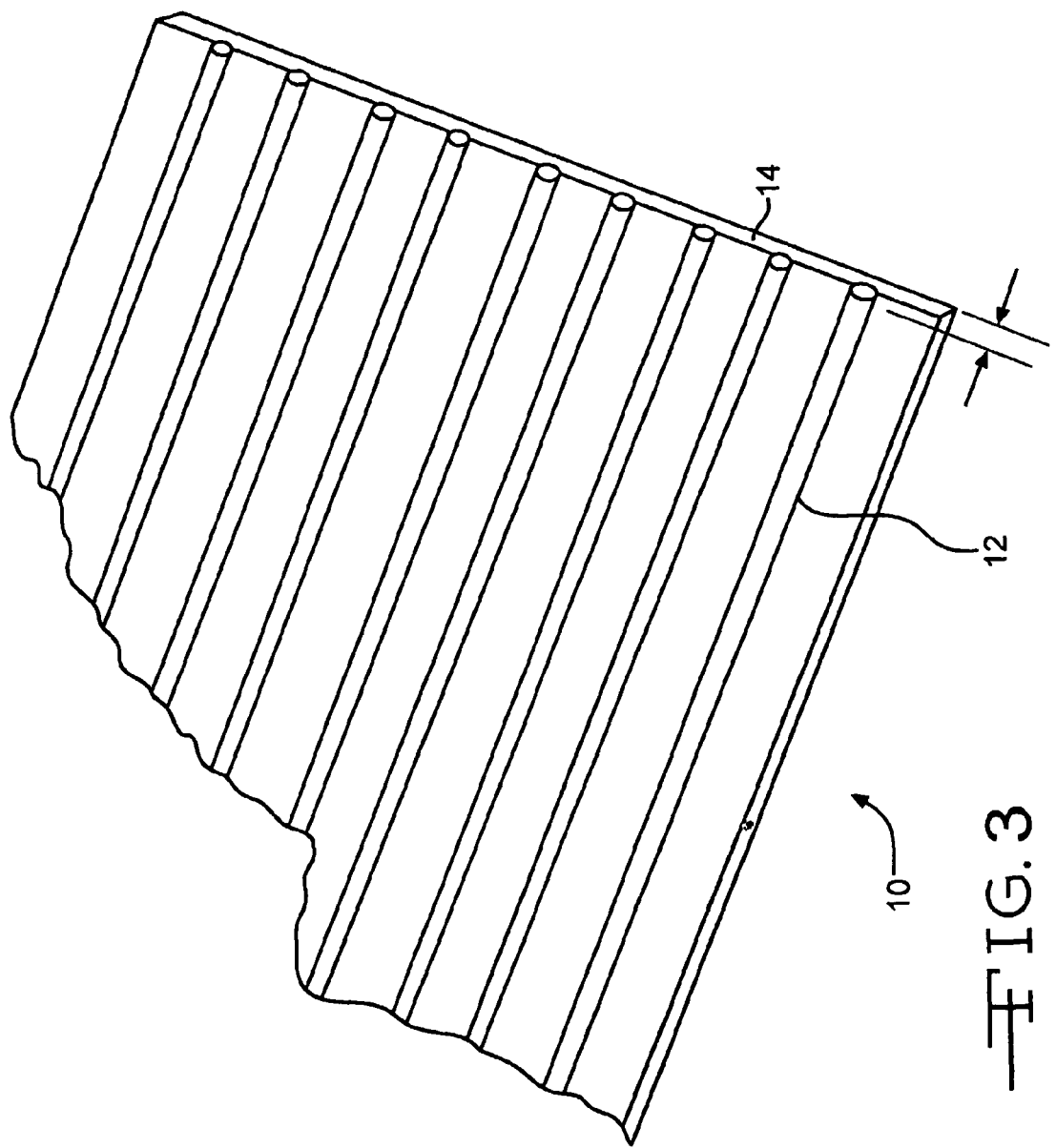
FIG. 3 is a perspective view of a first embodiment of a unitary separator spacer that is useful in batteries according to the present invention.

Separator design can be manipulated to so that the separator also performs the function of providing the free space. One such separator design, illustrated in FIG. 3, is embodied in a separator spacer indicated generally at 10. The separator spacer 10 is produced by depositing ribs 12 directly on an absorbent separator mat 14. Techniques for depositing ribs on absorbent separator mats for batteries are well known and widely used. The ribs 12 preferably comprise any one of a number of suitable polymeric materials, which can be heated and softened and dispensed through nozzles, i.e., hot melt materials. The absorbent separator mat 14 preferably comprises an absorbent glass mat, with or without a minor proportion of synthetic fibers. It will be readily appreciated, however, that a wide variety of mats can be employed. Mats that can absorb three or more times their weight in sulfuric acid are preferred and mats which can absorb five or more times their weight in sulfuric acid are more preferred. Mats, which can absorb about six or more times their weight in sulfuric acid, are most preferred. Such mats may be constituted by all glass fibers, a mixture of glass fibers with other organic or inorganic fibers, or organic fibers with suitable pore size and adequate absorption capacity. In fact, any porous fiber based mat having the desired absorption capacity, combined with a capacity to filter silica particles, as discussed above, is well suited for the present invention.

Figure 4:
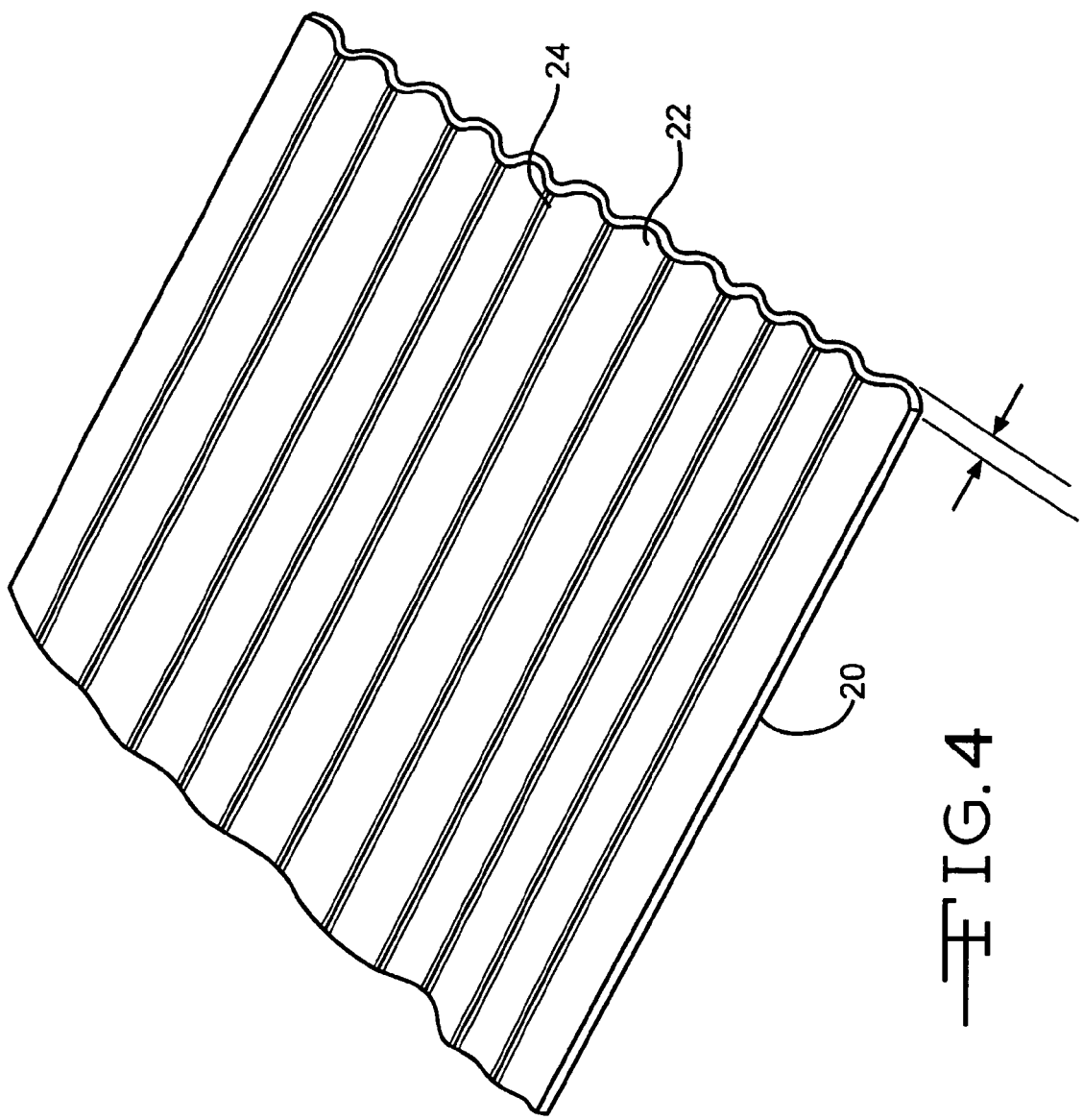
FIG. 4 is a perspective view of a second embodiment of a unitary separator spacer that is useful in batteries according to the present invention.

Another technique for producing a separator spacer is to corrugate an absorbent separator mat in such a manner as to ensure that columns of gel will be formed adjacent to the electrodes. A corrugated absorbent separator mat is indicated generally at 20 in FIG. 4. The separator 20 has furrows 22 and ridges 24 and can be produced in the following manner. Roll stock of absorbent glass mat is partially saturated with an aqueous solution containing sodium silicate or another suitable binding agent for the fibers of the absorbent separator. Good results have been obtained using a 5 percent by weight sodium silicate aqueous solution. The purpose of the sodium silicate is to harden the AGM material and render it easier to corrugate and improve its ability to hold a corrugated form. The partially saturated roll stock material is then slightly dried, by passage through a heat tunnel. The roll stock material is then forced through two metal corrugating rolls. During passage through the interlocking rolls, the roll stock material acquires the corrugated form. Following corrugation, the roll stock material is further dried and, after drying, it can be either cut into sheets or sliced and rolled into smaller rolls of appropriate dimensions for use in automated wrapping machinery.

Figure 8:
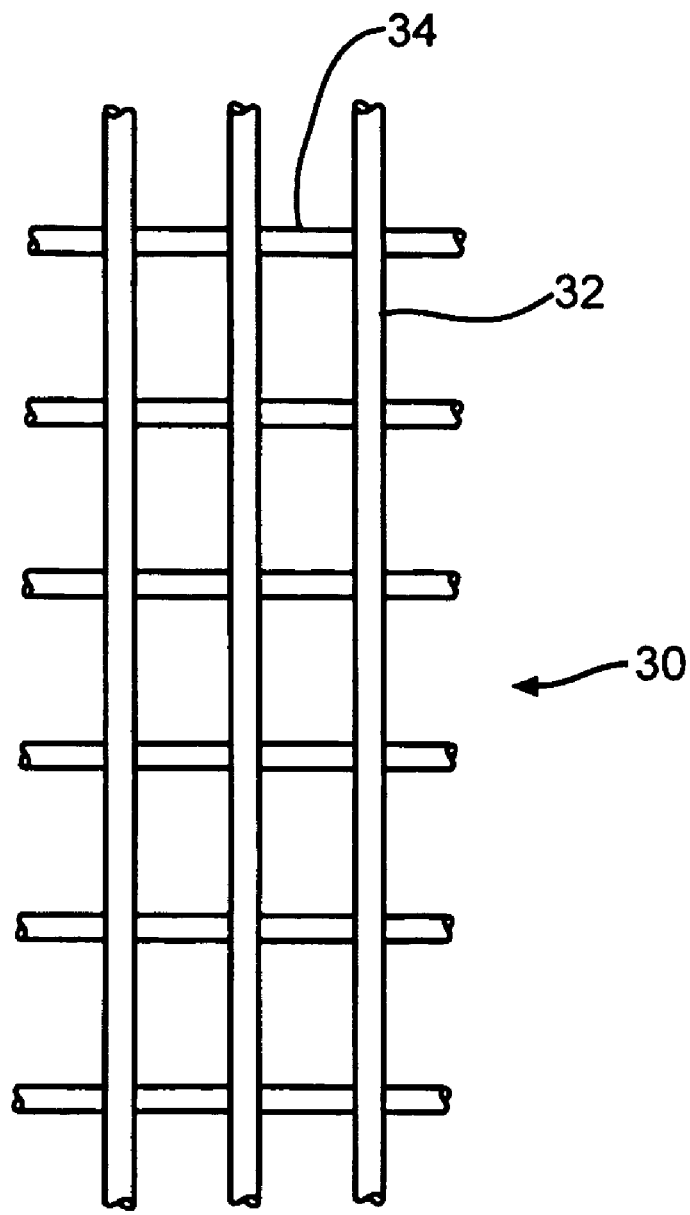
FIG. 8 is a plan view of a spacer suitable for use in the present invention.

In some battery designs, it might be equally desirable to create free space between the separator and the plate by the use of separate spacers made of rigid or semi rigid polymeric materials. Preferably, such spacers would provide for vertically extending channels, which would facilitate the filling of a battery with electrolyte. Such a spacer is indicated generally at 30 in FIG. 8. The spacer 30 comprises longitudinally extending rods 32 and laterally extending connectors 34. The rods 32 have a diameter which exceeds the diameter of the connectors 34 so that, when the spacer 30 is positioned between a separator and a plate inside a battery, with the rods 32 extending vertically in the battery case, there are vertically extending channels adjacent the rods 32, These channels readily enable electrolyte to reach the bottom of the battery case. Such material is available from Conwed Plastics.

In sum, separators that are suitable for use in the present invention:

Must have a pore size that is capable of filtering out silica particles present in electrolyte comprising sulfuric acid and silica; and Must absorb several times their weight of electrolyte inside the battery, thus increasing the concentration of silica particles in unabsorbed electrolyte to or near the level required for gelling. In practice, the separators have to absorb at least 3-4 times their dry weight in sulfuric acid in order to accomplish this task.

In addition, in case it is desired to form a gel adjacent the active material on the plates, then either the separators themselves or separate spacers must cause there to be free space between the absorbent separator or at least portions of the absorbent separator, and the plates or tubular electrodes. This free space can be provided by a unitary separator spacer comprising AGM that has ribs or has been corrugated, or by combining an absorbent separator with a spacer made of rigid or semi-rigid polymeric materials. How these various separator requirements interact will depend on the battery design requirements and its application.

As noted above, there are several sources of silica particles, ranging from the very small silica aggregates of fumed and colloidal silica to the coarser agglomerates of dried precipitated silica. Precipitated silica is also available in the form of never dried silica slurries. These are emulsions of precipitated silica particles in water and they are an intermediate product in the production of precipitated, spray dried silica powders. Silica slurries are especially suited for use in the system of the present invention and can be used whether they have been milled or have not been milled. The silica particles in milled precipitated silica slurries have mean diameters that range from about 2-20 microns, and this is a preferred range in certain applications of the present system. The mean particle diameter of silica particles in unmilled slurries is typically from 10-25 microns and this particle size also offers advantages for other applications of this invention. Since the milled and the unmilled materials can be mixed, it will be appreciated that mean diameter of the never dried precipitated silica that is used in practicing the instant invention can range from 2-25 microns.

Figure 5:
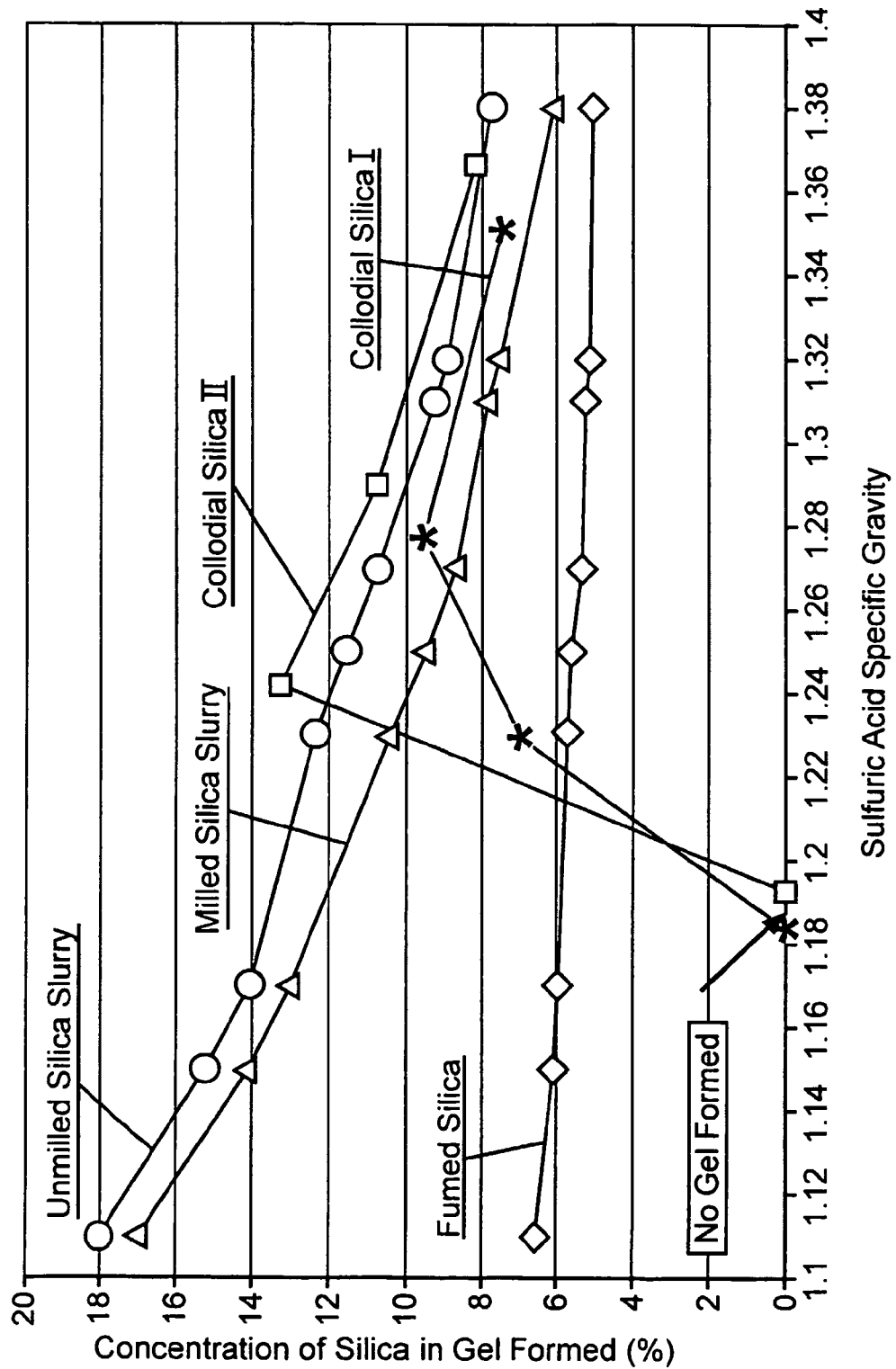
FIG. 5 is a graph showing silica concentrations in sulfuric acid—silica gels formed when 3% by weight additions of different types of silica were made to sulfuric acid of various densities.

For a given acid concentration, mixtures of silica particles and sulfuric acid have a critical concentration of silica that must be reached before gel will form. This concentration depends on silica particle size and on the nature of the silica particles. The finer the silica particle, the lower is the required silica concentration to achieve gel formation. Since the smallest available silica particle sources are found in colloidal and fumed silica, these sources are more efficient at gel formation. On the other hand, the larger sized precipitated silica slurries are much less efficient in gel formation. FIG. 5 shows that for very fine particle silica, i.e., fumed silica, the amount of silica in gels formed at various sulfuric acid concentrations from 1.15 specific gravity to 1.38 specific gravity, varies only about one and one half percent, i.e., from 5% to 6.5%. This is a narrow range of reactivity. However, the larger particle, less reactive, silica from never dried precipitated silica slurries show a wide variation in the concentration of silica in the gels formed, from a high of 17% to 18%, at about 1.15 specific gravity, to low values of about 6% to 8%, at a sulfuric acid specific gravity of about 1.38.

A centrifuge was used to obtain the data reported in FIG. 5 and, except for that concerning two colloidal silicas, tabulated in Table 1, below. Sulfuric acid, of several different specific gravities, was mixed with 3 percent by weight of silica from different sources, put into a test tube and the tube was spun in a centrifuge at 3500 revolutions per minute for at least one hour and, in some case, up to two hours. This caused the silica particles in the sulfuric acid silica particle mixture to concentrate at one end of the test tube. The centrifuge was then stopped and the concentration of silica in the gel formed at the end of the test tube was determined, is reported in Table 1, and is plotted in FIG. 5. Differences in the silica concentrations can be attributed to differences in the nature and size of the silica particles, and also to the specific gravity of the sulfuric acid.

TABLE 1

| Electrolyte Specific Gravity | Unmilled Silica Slurry | Milled Silica Slurry | Fumed Silica |
|---|---|---|---|
| 1.375 | 7.7% | 6.1% | 5% |
| 1.320 | 8.9% | 76% | 5.1% |
| 1.310 | 9.2% | 7.9% | 5.2% |
| 1.270 | 10.7% | 8.7% | 5.3% |
| 1.250 | 11.5% | 9.5% | 5.6% |
| 1.230 | 12.3% | 10.5% | 5.7% |
| 1.170 | 14% | 13% | 5.9% |
| 1.150 | 15.2% | 14.2% | 6% |
| 1.110 | 18% | 17% | 6.5% |

Figure 6:
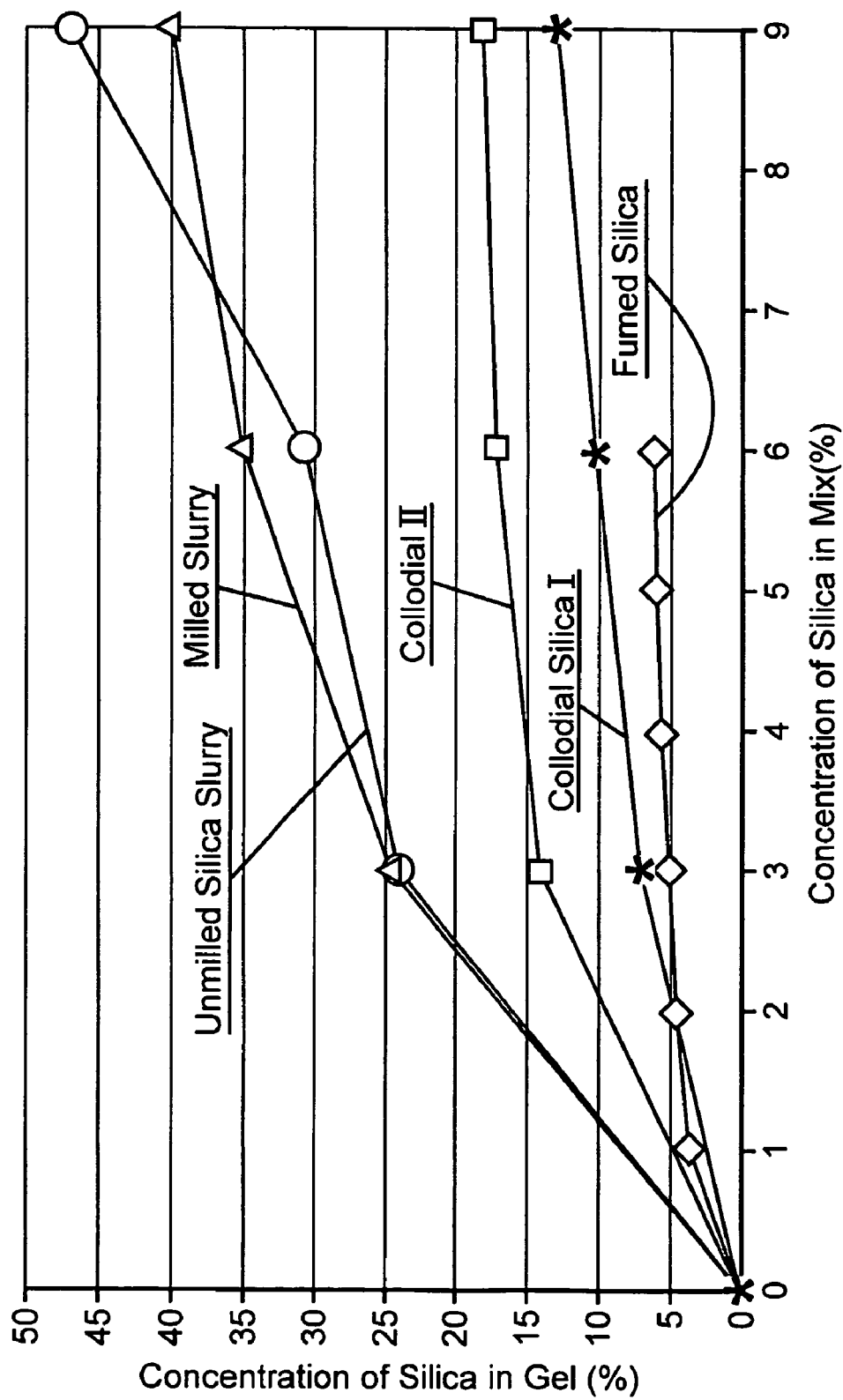
FIG. 6 is a graph showing the concentrations in weight percent of silica in gels formed when various concentrations of different types of silica were mixed with sulfuric acid of 1.250 specific gravity.

The impact of original silica particle concentration in a sulfuric acid silica particle mixture on the concentration of silica in gel formed, at a sulfuric acid specific gravity of 1.250, is presented in FIG. 6 for fumed silica, for silica from milled and unmilled, never dried precipitated silica slurries, and for silica from two different colloidal silicas.

Figure 7:
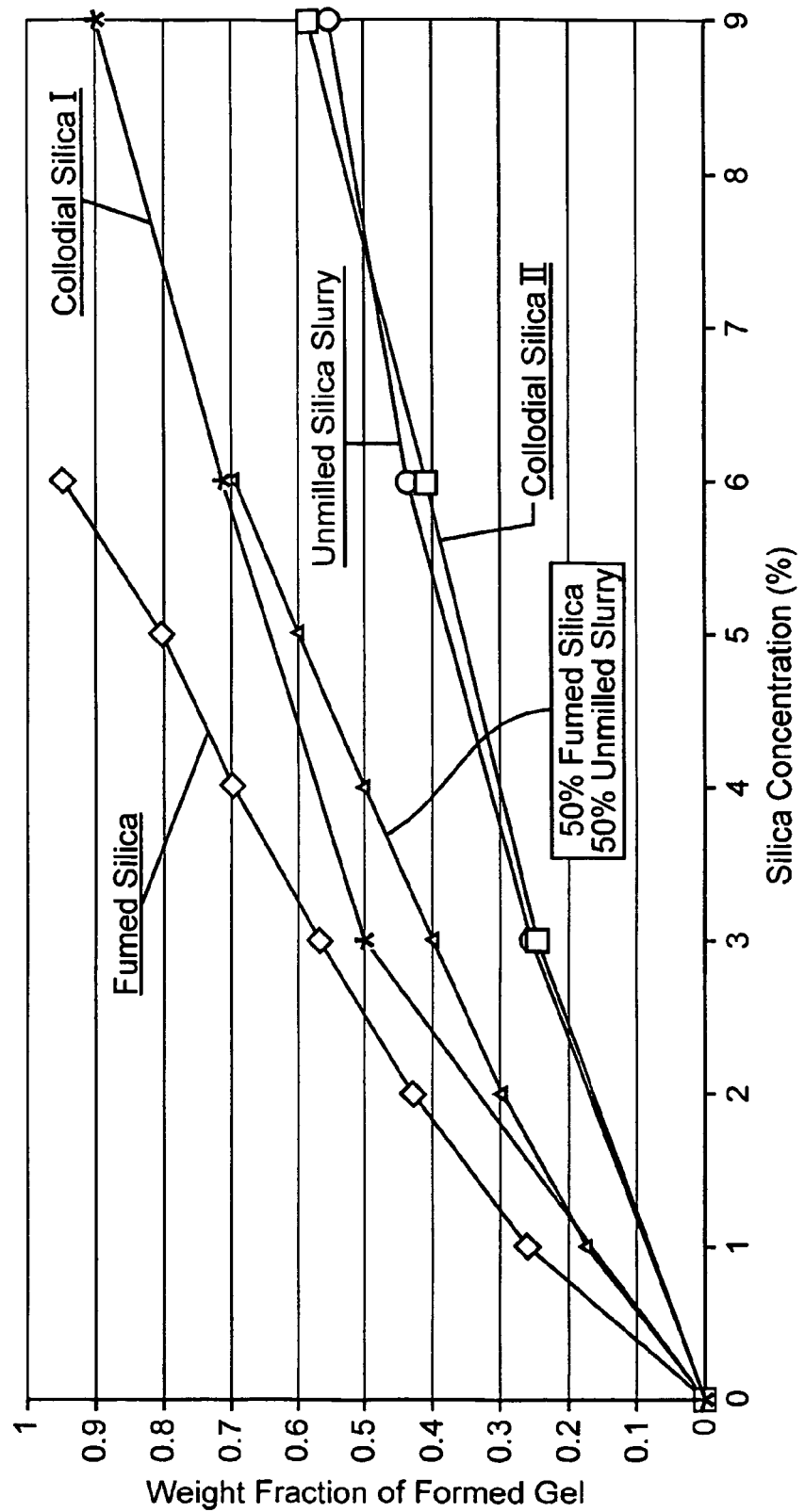
FIG. 7 is a graph showing the weight fraction of gel formed from mixtures of sulfuric acid, 1.250 specific gravity, and from 0 to 9 percent by weight of various silica particles.

The weight fraction of gel formed from mixtures of sulfuric acid, 1.250 specific gravity, and silica particles from various sources, ranging from 0 to 9% by weight of the acid, is shown in FIG. 7 and, for silica from some of the sources, is presented in Table 2, below.

TABLE 2

| % of Silica in Mixture | Unmilled Silica Slurry | Fumed Silica | 50% Fumed Silica/50% Unmilled Silica Slurry |
|---|---|---|---|
| 0 | 0 | 0 | 0 |
| 1 | 0.105 | 0.256 | 0.18 |
| 2 | 0.18 | 0.426 | 0.3 |
| 3 | 0.251 | 0.566 | 0.4 |
| 4 | 0.3 | 0.702 | 0.514 |
| 5 | 0.35 | 0.806 | 0.6 |
| 6 | 0.416 | 0.952 | 0.685 |

Figure 9:
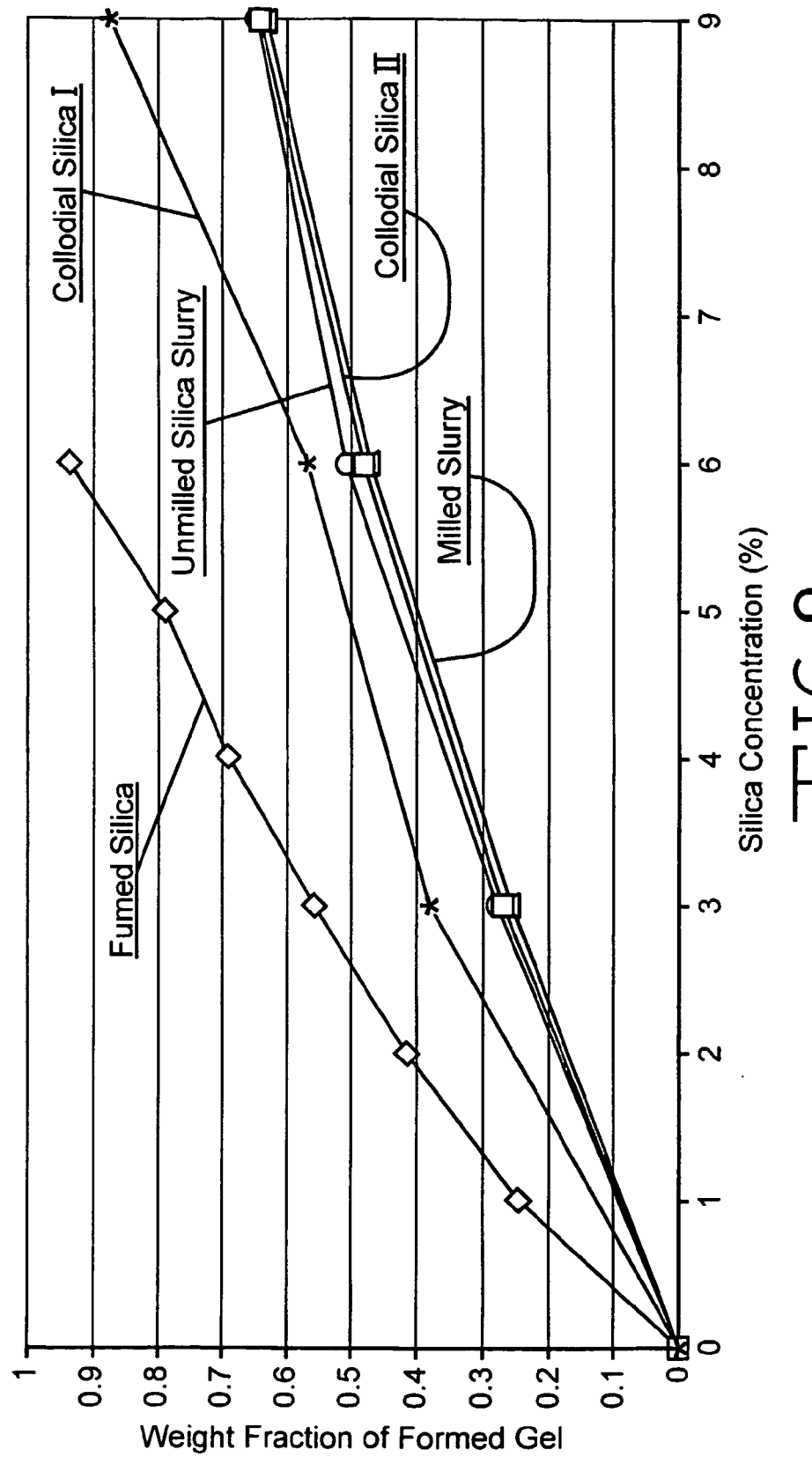
FIG. 9 is a graph showing the weight fraction of gel formed from mixtures of sulfuric acid, 1.300 specific gravity, and from 0 to 9 percent by weight of various silica particles.
Figure 10:
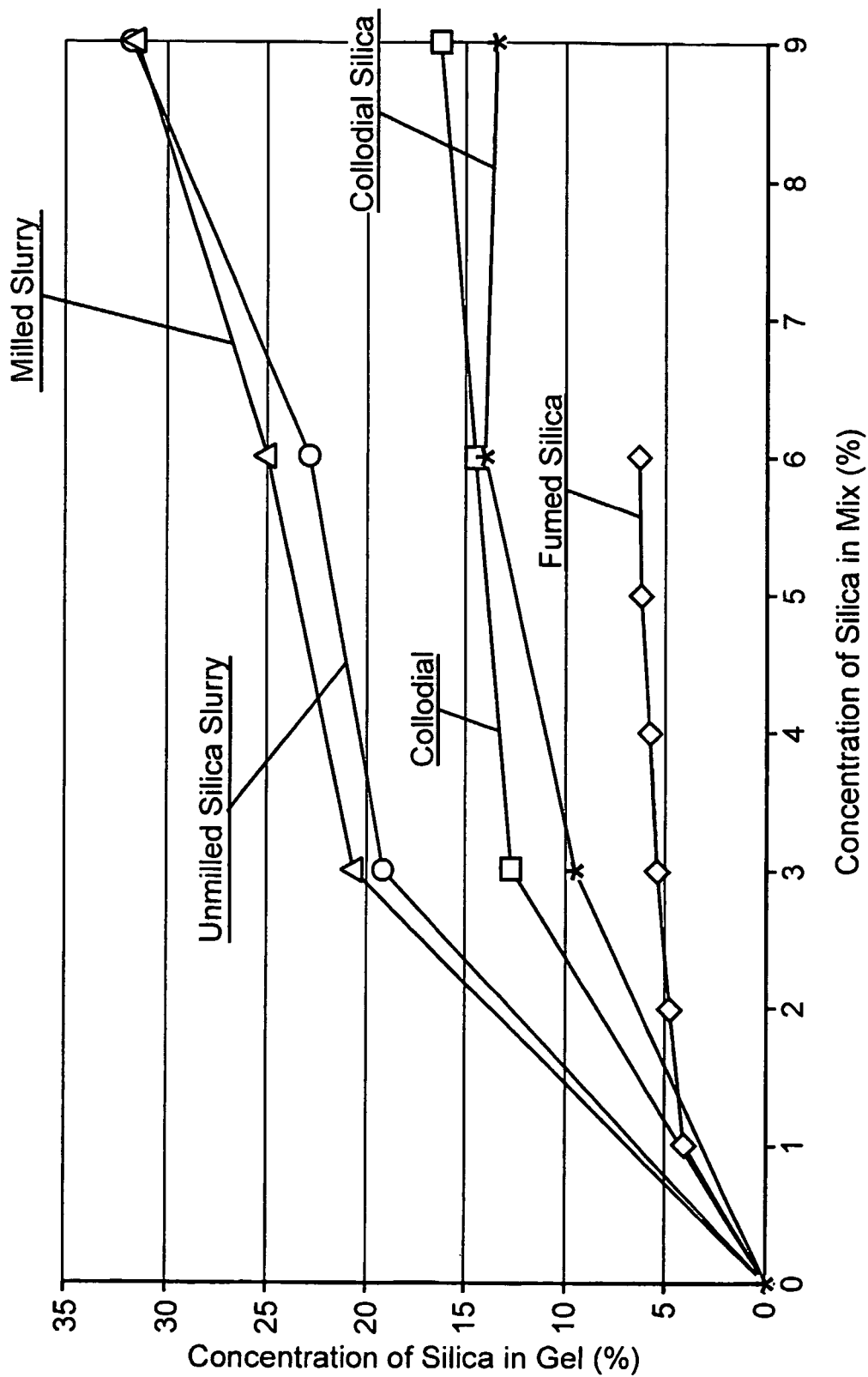
FIG. 10 is a graph showing silica concentrations in sulfuric acid—silica gels formed when additions of various percentages by weight of different types of silica were made to sulfuric acid of 1.300 specific gravity.

FIGS. 9 and 10 show, for various silica sources, weight fraction of formed gel and concentration of silica in gel, at various silica concentrations, when the specific gravity of the sulfuric acid was 1.300.

It becomes clear from the relationships presented here that fumed silica is more than twice as effective at forming a gel with sulfuric acid of 1.250 specific to gravity, than is silica from unmilled, never dried precipitated silica slurries. It is also clear that the amount of silica from a never dried precipitated silica slurry that is required to form a gel varies over a wide range, i.e., about ten percent, as sulfuric acid specific gravity goes from 1.1 to 1.38, while the amount of fumed silica that is required to form gel varies over a narrow range, i.e., less than two percent, as sulfuric acid specific gravity goes from 1.1 to 1.38. Preferred silica for use in the present invention has a range of reactivity, as specific gravity of sulfuric acid goes from 1.1 to 1.38, of at least two percent. A more preferred silica for use in the present invention has a range of reactivity, as specific gravity of sulfuric acid goes from 1.1 to 1.38, of at least four percent. It is even more preferred that silica for use in the present invention has a range of reactivity, as specific gravity of sulfuric acid goes from 1.1 to 1.38, of at least five percent.

In sum, a method for producing a battery according to the present invention involves electrolyte preparation, battery filling and gel formation. A preferred electrolyte comprises sulfuric acid of a density from 1.050 to 1.300 g/cc and an amount of silica particles that results in a total silica content that varies from 0.5% to 5% by weight of the total mixture weight. The electrolyte is used to fill lead acid batteries containing absorbent separators and spacers. The lead acid battery can be assembled with either unformed or preformed and dried plates. Gel formation in the residual, unabsorbed electrolyte occurs towards the end of the electro-formation for the batteries assembled with unformed plates or electrodes, or, preferably, towards the end of the charging of batteries assembled with formed and dried plates or electrodes In the case of batteries which do not include spacers to define free space for the formation of a gel, gelling of the electrolyte around the edges of the plates and the edges of the separator material is accomplished with an electrolyte comprising sulfuric acid and at least about 0.5 percent by weight of silica from a never dried precipitated silica slurry. More preferably, the electrolyte contains about 1 percent by weight of silica from never dried precipitated silica slurry. Generally speaking, from about 0.5 up to about 1.5 or 2.0 percent by weight of silica from a never dried precipitated silica slurry will be effective in a sulfuric acid solution to effect gelling of the electrolyte around the edges of the separators and the edges of the plates in a battery that does not include spacers.

It will be appreciated that various changes and modifications of the invention as specifically disclosed above can be made without departing from the spirit and scope thereof as defined in the appended claims.

We claim:

1. A method for producing a lead acid battery that operates on the oxygen cycle, said method comprising the steps of:
    assembling a cell comprising a pasted, unformed positive plate, a pasted, unformed negative plate, and, between the plates, a sheet of separator material which is an absorbent, porous filtration medium wherein there is free space between at least one of the plates and at least one of the surfaces of the separator,
    inserting the cell into a case,
    introducing into the case a mixture of sulfuric acid, of a given, first specific gravity, and silica including at least 10 percent by weight of silica from a never dried precipitated silica slurry, the mixture containing silica in a first, given silica concentration, which is below that which would cause sulfuric acid having the given specific gravity to gel, whereby sulfuric acid is absorbed into the plates and the absorbent, porous filtration medium of the separator material while silica is filtered out of that sulfuric acid, thereby increasing the concentration of silica in sulfuric acid which remains in the free space to a second silica concentration which is higher than the first concentration and is below the concentration which would cause the sulfuric acid in the mixture in the free space to gel,
    sealing the case, and
    forming the plate to increase the concentration of the sulfuric acid in the cell to one which, at the second concentration of silica, causes gelation of the sulfuric acid in the free space.

2. A method for producing a gelled lead acid battery that operates on the oxygen cycle, said method comprising the steps of:
    assembling a cell comprising a positive plate which has been formed and dried, at least one negative plate which has been formed and dried, and separator material between the plates, wherein the separator material constitutes an absorbent porous filtration medium and wherein there is free space between at least one of the surfaces of the separator material and at least one of the surfaces of the plates;
    inserting the cell into a case,
    introducing into the case a mixture of sulfuric acid of a given, first specific gravity, and silica including at least some silica from a never dried precipitated silica slurry, the mixture containing silica in a first, given concentration, which is below that which would cause sulfuric acid having the given specific gravity to gel, whereby sulfuric acid is absorbed into the plates and the absorbent porous filtration medium of the separator material while silica is filtered out of that sulfuric acid, thereby increasing the concentration of silica in the mixture which remains in the free space to a second concentration which causes the sulfuric acid in the mixture in the free space to gel, and sealing the case.

3. The method claimed in claim 1 wherein the mixture of sulfuric acid and silica comprises sulfuric acid having a specific gravity between about 1.200 and 1.250 and,
    wherein the silica particles are present in a concentration between about 2 and 15 weight product.

4. The electrolyte method claimed in claim 3 wherein some of the silica particles are from fumed silica and such silica particles are present in a concentration between about 0.5 to 5.0 weight percent.

5. The method claimed in claim 1 or 2 wherein the separator comprises entangled fibers, wherein the separator is operable to absorb at least three times its weight of sulfuric acid electrolyte, wherein the separator has a pore structure such that it is operable to filter silica particles as small as 3 microns from a mixture of sulfuric acid and silica particles and wherein the separator is operable, when positioned between plates in a cell in a case, to define free space between at least one of its surfaces and at least one of the surfaces of the plates.

6. The method claimed in claim 1 or 2 wherein the separator comprises
    a sheet comprising entangled fibers, wherein the sheet has opposed major surfaces and is operable to absorb at least three times its weight of sulfuric acid and has a pore structure such that it is operable to filter silica particles as small as 3 microns from a mixture of sulfuric acid and silica particles, and wherein the sheet is contoured so that, when it is positioned between facing major surfaces of adjacent plates of a battery, with its major surfaces facing the major surfaces of the plates, there is at least one space between a major surface of the separator and the adjacent major surface of the separator.

7. A method as claimed in claim 1 wherein the positive electrode is a tubular electrode.

8. A battery produced by the method of claim 1.

9. A method as claimed in claim 1 wherein the silica includes at least 50 percent by weight of silica from a never dried precipitated silica slurry.

10. The method claimed in claim 1 wherein gelling of the sulfuric acid in the free space takes place towards the end of plate formation.

11. The method claimed in claim 2 for producing a lead acid battery wherein the mixture of sulfuric acid and silica that is introduced thereinto prior the sealing of the case and forming of the plate comprises
   sulfuric acid having a specific gravity between about 1.250 and 1.280 and
   silica particles, at least 10% by weight of which are from a never dried precipitated silica slurry, and
   wherein the silica particles are present in a concentration between about 2 and 15 weight percent.

12. The method claimed in claim 11 wherein some of the silica particles in the mixture of sulfuric acid and silica particles are from fumed silica and such silica particles are present in a concentration between about 0.5 to 5.0 weight percent.

13. A method as claimed in claim 2 wherein the positive electrode is a tubular electrode.

14. A battery produced by the method of claim 2.

15. A method as claimed in claim 2 wherein the silica includes at least 50 percent by weight of silica from a never dried precipitated silica slurry.

16. A method for producing a lead acid battery that operates on the oxygen cycle, said method comprising the steps of:
   assembling a cell comprising a pasted, unformed positive plate, a pasted, unformed negative plate, and, between the plates, a sheet of separator material which is an absorbent, porous filtration medium,
   inserting the cell into a case so that there is free space between the case and the adjacent edges of the plates and of the separator material,
   introducing into the case a mixture of sulfuric acid and silica including at least about 0.5 percent by weight of silica from a never dried precipitated silica slurry, the mixture containing silica in a first, given concentration, which is below that which would cause sulfuric acid having the given specific gravity to gel, whereby sulfuric acid is absorbed into the plates and the absorbent, porous filtration medium of the separator material while silica is filtered out of that sulfuric acid, thereby increasing the concentration of silica in sulfuric acid which remains in the free space to a second concentration which is higher than the first concentration and is below the concentration which would cause the sulfuric acid in the mixture in the free space to gel, and increasing the specific gravity of the sulfuric acid in the cell, by forming the plates, to a concentration which, in combination with the second concentration of silica, causes gelation of the sulfuric acid in the free space.

17. A method as claimed in claim 16 wherein the positive electrode is a tubular electrode.

18. A battery produced by the method of claim 16.

19. A method as claimed in claim 16 wherein the silica includes at least 50 percent by weight of silica from a never dried precipitated silica slurry.

20. A method for producing a lead acid battery that operates on the oxygen cycle, said method comprising the steps of:
   assembling a cell comprising a formed and dried positive plate, a formed and dried negative plate, and, between the plates, a sheet of separator material which is an absorbent, porous filtration medium,
   inserting the cell into a case so that there is free space between the case and the adjacent edges of the plates and of the separator material,
   introducing into the case a mixture of sulfuric acid and silica including at least about 0.5 percent by weight of silica from a never dried precipitated silica slurry, the mixture containing silica in a first, given concentration, which is below that which would cause sulfuric acid having the given specific gravity to gel, whereby sulfuric acid is absorbed into the plates and the absorbent, porous filtration medium of the separator material while silica is filtered out of that sulfuric acid, thereby increasing the concentration of silica in sulfuric acid which remains in the free space to a second concentration which is higher than the first concentration and is sufficiently high to cause the sulfuric acid in the mixture in the free space to gel.

21. A method as claimed in claim 20 wherein the positive electrode is a tubular electrode.

22. A battery produced by the method of claim 20.

23. A method as claimed in claim 20 wherein the silica includes at least 50 percent by weight of silica from a never dried precipitated silica slurry.

\* \* \* \* \*

UNITED STATES PATENT AND TRADEMARK OFFICE
CERTIFICATE OF CORRECTION

| | |
|---|---|
| PATENT NO. | : 7,682,738 B2 |
| APPLICATION NO. | : 10/504700 |
| DATED | : March 23, 2010 |
| INVENTOR(S) | : Antonio Ferreira, George Zguris and Norman Lifshutz |

It is certified that error appears in the above-identified patent and that said Letters Patent is hereby corrected as shown below:

In column 8, line 32, please replace --M2/g-- with --m2/g--

In column 11, line 31, please replace the word --tom-- with --torn--

In column 11, line 43, please replace the word --Energy Guard™-- with --Energy Guard®--

In column 12, line 7, please replace the word --tom-- with --torn--

In column 12, line 20, please replace the word --Energy Guard™-- with --Energy Guard®--

In column 12, line 63, please replace the word --Energy Guard™-- with --Energy Guard®--

In column 13, line 6, please delete the letter "s" before the word "sodium"

In column 14, line 7, please replace the word --Energy Guard™-- with --Energy Guard®--

In column 14, line 60, please replace the word --Energy Guard™-- with --Energy Guard®--

In column 15, line 26, please replace the word --Energy Guard™-- with --Energy Guard®--

In column 24, line 35, please replace the word --product-- with --percent--

In column 25, line 6, please replace the word --the-- before the word "sealing" with --to--

Signed and Sealed this

Twentieth Day of July, 2010

David J. Kappos
*Director of the United States Patent and Trademark Office*